United States Patent [19]
Darmory et al.

[11] 3,993,630
[45] Nov. 23, 1976

[54] POLYIMIDE, POLYAMIDE-IMIDE OR POLYAMIDE-ACIDS WITH OLEFIN END GROUPS IN COMBINATION WITH A REACTIVE SCHIFF BASE COMPOUND

[75] Inventors: Franklin P. Darmory, Ardsley; Marianne DiBenedetto, Pleasantville, both of N.Y.

[73] Assignee: Ciba-Geigy Corporation, Ardsley, N.Y.

[22] Filed: Dec. 26, 1973

[21] Appl. No.: 427,975

[52] U.S. Cl. .................. 260/78 TF; 260/30.2; 260/30.4 N; 260/30.6 R; 260/30.8 R; 260/30.8 DS; 260/32.2; 260/32.4; 260/32.6 N; 260/46.5 E; 260/47 CP; 260/47 UA; 260/47 P; 260/49; 260/63 N; 260/65; 260/78 UA; 260/78 SC; 428/435; 428/474
[51] Int. Cl.$^2$ ............... C08G 73/10; C08G 73/12
[58] Field of Search ...... 260/47 UA, 78 UA, 78 TF, 260/49, 47 CP, 65, 63 N, 78 SC, 46.5 E, 47 P, 30.2, 30.4 N, 30.6 R, 30.8 R, 30.8 DS, 32.2, 32.4, 32.6 N

[56] References Cited
UNITED STATES PATENTS
3,842,143  10/1974  Winter.................. 260/857 PA

*Primary Examiner*—Lester L. Lee
*Attorney, Agent, or Firm*—Charles W. Vanecek

[57] ABSTRACT

This invention provides compositions containing
  a. a polyimide and polyamide-imide terminated with olefinic unsaturated end groups, or the corresponding polyamide-acids in combination with a reactive Schiff base compound, and
  b. a polyimide and polyamide-imide terminated with a Schiff base end group or the corresponding polyamide acids in combination with a reactive N,N'-bis-imide.

These Schiff bases and N,N'-bis-imide compounds facilitate processing of the prepolymer resins by lowering the softening temperature, under processing conditions, and chain-extend and cross-link the base resins.

32 Claims, No Drawings

POLYIMIDE, POLYAMIDE-IMIDE OR POLYAMIDE-ACIDS WITH OLEFIN END GROUPS IN COMBINATION WITH A REACTIVE SCHIFF BASE COMPOUND

BACKGROUND OF THE INVENTION

Many previously known polyimide and polyamide-imide resins suffer from their inability to be processed at elevated temperatures. These resins are often characterized by their insolubility and infusibility properties which make them practically impossible to process with conventional plastics process equipment. As a consequence, the resins are usually handled in the form of their precursor polyamide acids. The precursor materials, while suitable for the preparation of thin films prepared from solution, cannot be handled by autoclaving and press molding techniques without great difficulty. The polyamide acid forms of both the polyimide and polyamide-imide resins undergo cyclization to the imide form during processing, giving rise to poorly consolidated and void filled parts of low mechanical strength.

It has now been found that, by the addition of certain reactive Schiff base compounds to polyimide and polyamide-imide prepolymers or their corresponding polyamide acids containing unsaturated end groups, or by the addition of an N,N'-bis-imide compound to polyimide or polyamide-imide prepolymers or their corresponding polyamide acids containing a Schiff base end group, it is possible to process these materials using conventional plastic processing techniques such as autoclave and vacuum bag laminating, compression and injecting molding. These additives while lowering the softening temperature of these prepolymers, also chain-extend and cross-link the base resin to give useful objects which possess good mechanical and thermooxidative properties as well as low void content.

DETAILED DISCLOSURE

This invention provides compositions containing olefinic unsaturated terminated prepolymers in combination with a reactive Schiff base compound and compositions containing Schiff base terminated prepolymers in combination with a reactive N,N'-bis-imide, and the crosslinked polymers obtained therefrom.

The first embodiment of this invention provides a composition comprising a prepolymer resin selected from olefinically unsaturated terminated polyimides and polyamide-imides or their corresponding polyamide-acid precursors and Schiff base compounds.

The cross-linked polymers of this invention are obtained by reacting the prepolymers of the Schiff base compounds at a temperature of from 100° to 350° C.

The quantities of prepolymer and of Schiff base are chosen in such a manner that the ratio

is between 2:1 and 6:1.

When the poly(Schiff bases) are prepared from an aldehyde, the optimum prepolymer to Schiff base ratio is 2:1 equivalence, and when the poly(Schiff base) is prepared from a ketone, the optimum bis-imide to Schiff base ratio is 3:1 equivalence. An equivalence is one unsaturated anhydride terminus for the prepolymer and one imine linkage of the Schiff base.

The Schiff base compounds facilitate processing of the prepolymer resin by lowering the softening temperature under processing conditions, chain-extend and cross-link the base resin through addition reactions without evolution of volatile by-products. Conventional plastic processing techniques such as autoclave and vacuum bag laminating, compression and injection molding can be used to fabricate useful objects which possess good mechanical and thermooxidative properties as well as low void content.

The cured resins are infusible and insoluble. They have excellent resistance to thermal stresses, have good dielectric properties and are endowed with excellent stability to chemical agents. They may be converted into multicellular materials or employed for bonding metals. They are also particularly useful for the preparation of laminates based on mineral fibres or moulded articles optionally in association with fibrous or pulverulent fillers.

Particularly useful Schiff base compounds of this invention are those having the formula:

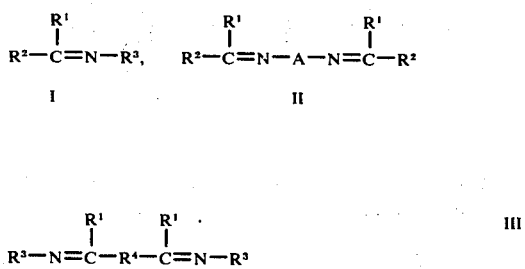

wherein $R^1$ and $R^2$ independently is hydrogen, an alkyl group containing from 1 to 12 carbon atoms, an aryl group containing from 6 to 12 carbon atoms, an alkaryl group containing from 7 to 15 carbon atoms, an aralkyl group containing from 7 to 15 carbon atoms, chlorophenyl, alkoxyphenyl said alkoxy containing from 1 to 5 carbon atoms or together with the carbon to which they are attached form a monocryclic ring containing 5 or 6 carbon atoms, with the proviso that only one of $R^1$ or $R^2$ may be hydrogen at the same time;

$R^3$ is an alkyl group containing from 1 to 12 carbon atoms, an aryl group containing from 6 to 12 carbon atoms, an alkaryl group containing from 7 to 15 carbon atoms, an aralkyl group containing from 7 to 15 carbon atoms, chlorophenyl, alkoxyphenyl, said alkoxy containing from 1 to 5 carbon atoms, cyclohexyl or cyclopentyl;

$R^4$ is an alkylene group containing from 2 to 12 carbon atoms, phenylene, tolylene, biphenylene, naphthalene, or an arylene group having the formula wherein X is —S—, —O—, NH, N-phenyl, sulfonyl, or an alkylene group containing from 1 to 4 carbon atoms; and A is an alkylene group containing from 2 to 12 carbon atoms; cycloalkylene group containing from 4 to 6 carbon atoms, a xylylene group, an arylene group selected from phenylene, tolylene, biphenylene, naphthylene, a substituted arylene group of the formula:

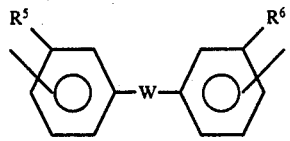

wherein W is sulfur, carbonyl, —NH, N-(lower)alkyl, —O—, —N-phenyl, sulfonyl, an alkylene group of from 1 to 4 carbon atoms, $R^5$ and $R^6$ are independent and each is hydrogen, chloro, or bromo, (lower) alkyl of from 1 to 5 carbon atoms, (lower) alkoxy containing from 1 to 5 carbon atoms, or a group having the formula

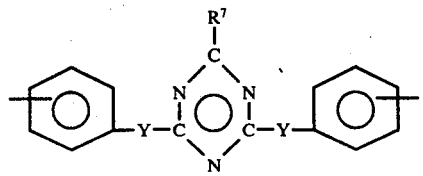

where Y is a covalent bond or —NH, and $R^7$ is phenyl, piperidino, hydrogen, diphenylamino or di(lower)alkyl amino.

The Schiff bases of formulas I, II and III comprise a well known class of compounds, and are obtained by reacting an aldehyde or ketone having the formulas

    IV or

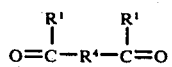    V wherein $R^1$, $R^2$ and $R^4$ are as defined previously with a mono or diamine having the formulas:

    VI or

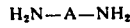    VII wherein $R^3$ and A are as defined previously, in equivalent amounts in an inert solvent. General methods for preparing the Schiff bases involve stirring the reactants in 95% ethanol and precipitation and drying of the product, or refluxing the reactants in either benzene or toluene under refluxing the reactants in either benzene or toluene under a Dean-Stark trap until the theoretical quantity of water distills over and separation and isolation of the Schiff base. Methods for preparing the Schiff bases of this invention are disclosed in Houben-Weyle, Methods of Organic Chemistry, Volume 11/2 (1958), page 73 ff, in J.A.C.S., 84,3673 (1962).

More particularly, illustrative of the divalent organic radicals represented by $R^1$, $R^2$ and $R^3$ are an aryl group containing from 6 to 12 carbon atoms, such as phenyl, naphthyl, p-nitrophenyl; an alkaryl group containing from 7 to 15 carbon atoms such as tolyl, dimethylphenyl; an aralkyl group containing from 7 to 15 carbon atoms, such as benzyl 2-phenylethyl; and an alkoxyaryl such as alkoxy phenyl, said alkoxy containing from 1 to 5 carbon atoms.

The chain extended and crosslinked resins of this invention are used as adhesives, laminating resins, coatings for decorative and electrical purposes and molding compounds.

The olefinically unsaturated terminated base resins which may be processed and crosslinked in presence of the Schiff base compounds include a polyamide-acid of the formula

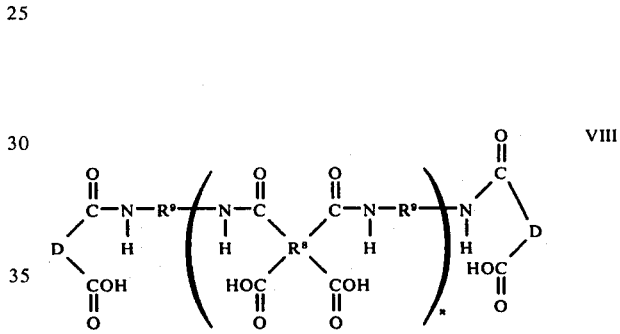   VIII and its corresponding polyimide of the formula

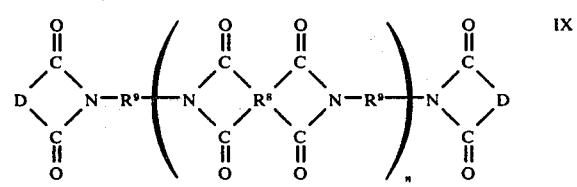   IX as well as a polyamide-amic acids of the formula

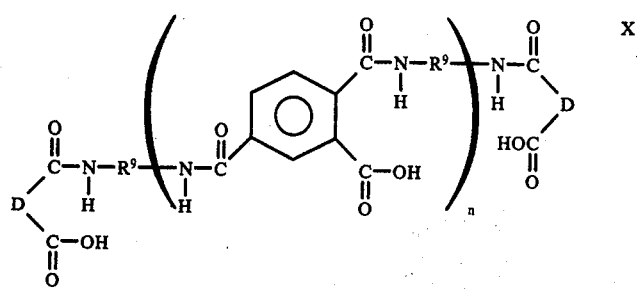
X
and
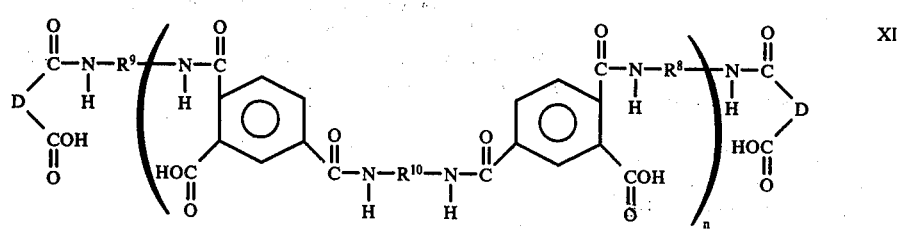
XI
and their respective corresponding polyamide-imide of the formulas
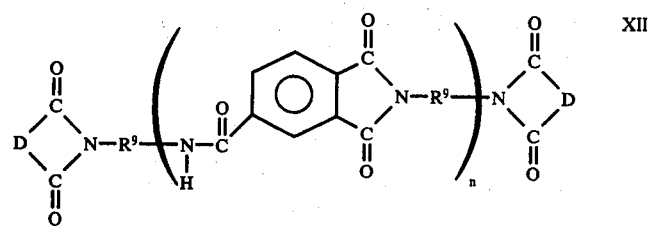
XII
and
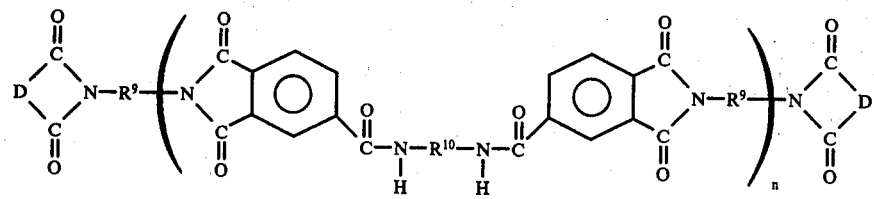

wherein

R⁸ is a tetravalent aliphatic, cycloaliphatic, aromatic or heterocyclic radical containing at least 2 carbon atoms;

R⁹ and R¹⁰ are the same or different and each is an alkylene group containing from 2 to 12 carbon atoms; a cycloalkylene group containing from 4 to 6 carbon atoms; an arylene group selected from phenylene, xylylene, tolylene, biphenylene, naphthylene, substituted arylene group of the formula

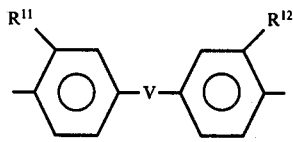

wherein V is sulfur, carbonyl, —NH, —N-(lower)alkyl, —SS, —O—,
sulfonyl, an alkylene group of from 1 to 4 carbon atoms, a di(lower)alkyl silyl group containing from 1 to 5 carbon atoms, a diphenyl silyl group, —P(O) (lower-)alkyl said lower alkyl containing from 1 to 5 carbon atoms,

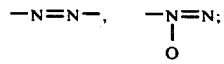

R¹¹ and R¹² are independent and each is hydrogen, chloro, bromo, lower alkyl containing from 1 to 5 carbon atoms, alkoxy containing from 1 to 5 carbon atoms or a group having the formula

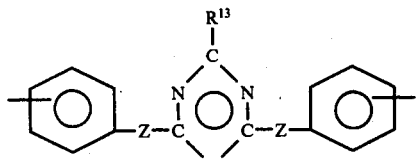

where Z is a covalent bond or —NH— and R¹³ is phenyl, piperidino, H, diphenylamino or di(lower)alkyl amino;

n is an integer of at least 1 and preferably from 2 to 100 and more preferably from 2 to 15;

D is a divalent radical containing olefinic unsaturation selected from the group having the formula

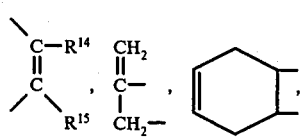

or

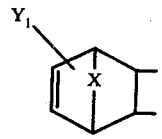

wherein
R¹⁴ and R¹⁵ independently of each other is hydrogen, methyl, bromo or chloro;
X is carbonyl, oxygen, methylene or sulfur.
Y₁ is hydrogen or methyl.
The radical D is derived from an ethylenically unsaturated anhydride of the formula

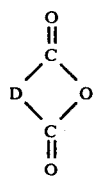

XIV wherein D is as defined hereinbefore, which may be, for example, maleic anhydride, citraconic anhydride, chloromaleic anhydride, dichloromaleic anhydride, bromomaleic anhydride and the like; and the product of a Diels-Alder reaction between a cyclodiene of the formula

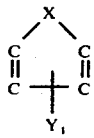

and an anhydride of the formula

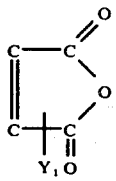

wherein X and Y₁ is as defined above, for example nadic anhydride and methylnadic anhydride.

More particularly, R⁸ is derived from a dianhydride characterized by the general formula

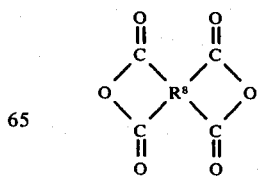

and may be a straight or branched chain saturated aliphatic radical having from 2 to 4 carbon atoms, a saturated alicyclic radical having 5 to 12 carbon atoms in the ring, a heterocyclic radical containing at least one of the atoms of O, N, and S, and an aromatic group containing at least one ring of six carbon atoms, said ring characterized by benzenoid unsaturation, the four carbonyl groups being attached directly to separate carbon atoms in a six membered benzenoid ring of the $R^8$ ring characterized by benzenoid unsaturation, the four radical and each pair of carbonyl groups being attached to adjacent carbon atoms in a ring of the $R^8$ radical and may be characterized by the following structures wherein $R^{17}$ and $R^{18}$ are alkyl of from 1 to 6 carbon atoms or aryl such as phenyl and substituted groups thereof, and radical having the structure

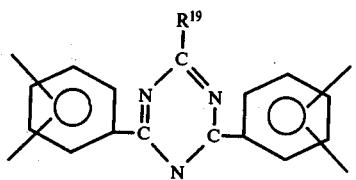

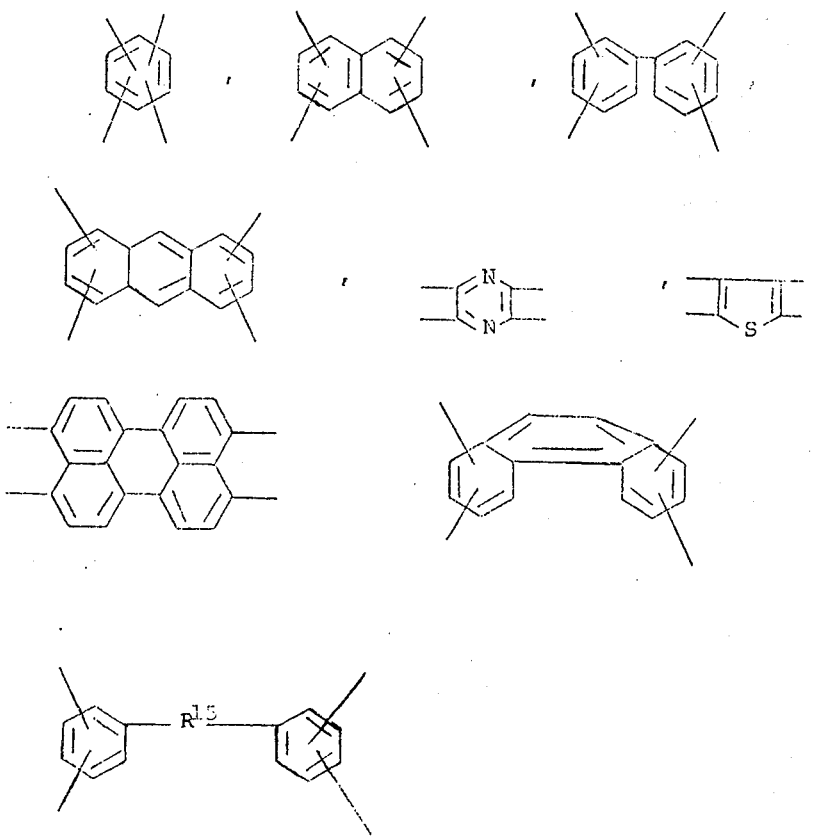

wherein $R^{16}$ is selected from the group consisting of

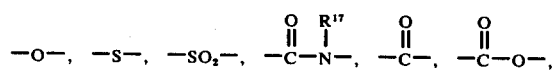

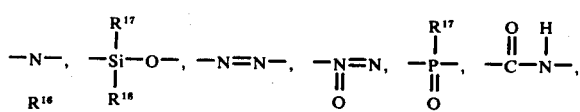

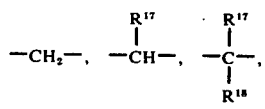

wherein $R^{19}$ is hydrogen, aryl such as phenyl and naphthyl; amino, diarylamino such as diphenylamino, dialkylamino such as dimethyl or diethylamino and the like. These latter type triazine based dianhydrides are described in greater detail in an application filed on May 1, 1972, Ser. No. 248,838 (Case GC 600).

In these dianhydrides every carbonyl group is attached directly to a separate carbon atom of the aromatic radical, the carbonyl groups being ortho or peri to each other so that 5— or 6— membered anhydride rings are formed respectively.

The preferred aromatic dianhydrides are those in which the carbon atoms of each pair of carbonyl groups are directly attached to ortho carbon atoms in the R group to provide a 5-membered ring as follows:

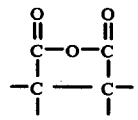

or

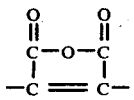

Suitable dianhydrides that are used alone or in a mixture are, among others:
Pyromellitic dianhydride
2,3,6,7-Naphthalenetetracarboxylic dianhydride
3,3',4,4'-Diphenyltetracarboxylic dianhydride
1,2,5,6-Naphthalenetetracarboxylic dianhydride
2,2',3,3'-Diphenyltetracarboxylic dianhydride
2,2-Bis-(3,4-dicarboxyphenyl)propane dianhydride
Bis-(3,4-dicarboxyphenyl)sulfone dianhydride
3,4,9,10-Perylenetetracarboxylic dianhydride
Bis-(3,4-dicarboxyphenyl)ether dianhydride
Ethylenetetracarboxylic dianhydride
Naphthalene-1,2,4,5-tetracarboxylic dianhydride
Naphthalene-1,4,5,8-tetracarboxylic dianhydride
Decahydronaphthalene-1,4,5,8 tetracarboxylic dianhydride
4,8-Dimethyl-1,2,3,5,6,7-hexahydronaphthalene-1,2,5,6-tetracarboxylic dianhydride
2,6-Dichloronaphthalene-1,4,5,8-tetracarboxylic dianhydride
2,7-Dichloronaphthalene-1,4,5,8-tetracarboxylic dianhydride
2,3,6,7-tetrachloronaphthalene-1,4,5,8-tetracarboxylic dianhydride
Phenanthrene-1,8,9,10-tetracarboxylic dianhydride
Cyclopentane-1,2,3,4-tetracarboxylic dianhydride
Pyrrolidine-2,3,5,5-tetracarboxylic dianhydride
Pyrazine-2,3,5,6-tetracarboxylic dianhydride
2,2-Bis-(2,5-dicarboxyphenyl)propane dianhydride
1,1-Bis-(2,3-dicarboxyphenyl)ethane dianhydride
Bis-(2,3-dicarboxyphenyl)methane dianhydride
Bis-(3,4-dicarboxyphenyl)methane dianhydride
Bis-(3,4-dicarboxyphenyl)sulfone dianhydride
Benzene-1,2,3,4-tetracarboxylic dianhydride
1,2,3,4-Butanetetracarboxylic dianhydride
Thiophene-2,3,4,5-tetracarboxylic dianhydride
3,3',4,4'-Diphenyltetracarboxylic dianhydride
3,4,3',4'-Benzophenonetetracarboxylic dianhydride
Azobenzenetetracarboxylic dianhydride
2,3,4,5-Tetrahydrofuran dianhydride
2-phenyl-4,6-bis(3',4'-dicarboxyphenyl)-s-triazine dianhydride
2-diphenylamino-4,6-bis(3',4'-dicarboxyphenyl)-s-triazine dianhydride Among the diprimary diamines which are suitable for preparing the Schiff base compounds of formula II and resins of the present invention and also from which $R^9$ and $R^{10}$ are derived include the following:
4,4'-Diamino-2,2'-sulfonediphenylmethane
Ethylenediamine
m-Phenylenediamine
p-Phenylenediamine
4,4'-Diaminodiphenylpropane
4,4'-Diamonodiphenylmethane
Benzidine
4,4'-Diaminodiphenyl sulfide
4,4'-Diaminodiphenylsulfone
3,3'-Diaminodiphenylsulfone
4,4'-Diaminodiphenyl ether
4,4'-Diaminobenzophenone
Bis-(4-aminophenyl)-N-methylamine
1,5-Diaminonaphthalene
3,3'-Dimethyl-4,4'-diaminobiphenyl
3,3'-Dimethoxybenzidine
Toluenediamine
Methylene bis(o-chloroaniline)
Methylene bis(o-methoxyaniline)
Methylene bis(o-methylaniline)
m-Xylylenediamine
p-Xylylenediamine
Bis-(4-aminocyclohexyl)-methane
Hexamethylenediamine
Heptamethylenediamine
Octamethylenediamine
Nonamethylenediamine
Decamethylenediamine
3-Methyl-heptamethylenediamine
4,4'-Dimethylheptamethylenediamine
2,11-diaminododecane
2,2-Dimethylpropylenediamine
3-Methoxyhexamethylenediamine
4,4'-(p-aminophenyl)dissulfide
2,5-Dimethylhexamethylenediamine
2,5-Dimethylheptamethylenediamine
5-Methylnonamethylenediamine
1,4-Diaminocyclohexane
1,12-Diaminooctadecane
2,5-Diamino-1,3,4-oxadiazole
$H_2N(CH_2)_3O(CH_2)_2O(CH_2)_3NH_2$
$H_2N(CH_2)_3S(CH_2)_3NH_2$
$H_2N(CH_2)_3N(CH_3)(CH_2)_3NH_2$
2-diphenylamino-4,6-bis(m-aminoanilino)-s-triazine
2-amino-4,6-bis(m-aminoanilino)-s-triazine
2-phenyl-4,6-bis(p-aminophenyl)-s-triazine
2-phenyl-4,6-bis(m-aminophenyl)-s-triazine
2-phenyl-4,6-bis(4'-aminoanilino)-s-triazine
2-phenyl-4,6-bis(3'-aminoanilino)-s-triazine
2-anilino-4,6-bis(4'-aminoanilino)-s-triazine
2-(N-methylanilino)-4,6-bis(3'-aminoanilino)-s-triazine
2-dimethylamino-4,6-bis(3'-aminoanilino)-s-triazine
2-diphenylamino-4,6-bis(2'-aminoanilino)-s-triazine
2-diphenylamino-4,6-bis(4'-aminoanilino)-s-triazine 2-phenyl-4,6-bis(2'-methyl-4'-aminoanilino)-s-triazine
2-diphenylamino-4,b-bis(3'-aminocyclohexylamino)-s-triazine
2H,4,6-piperidino-4,6-bis(3'-aminoanilino)-s-triazine
2,4-bis(3'-aminoanilino)-s-triazine
2-amino-4,6-(bis(3'-aminoanilino)-s-triazine
2-diphenylamino-4,6-bis[4-(p-aminophenoxy)anilino]-s-triazine Among the monoamines of formula VI which are suitable for preparing the Schiff base of formulas I and III include methylamine, butylamine, isobutylamine, hexylamine, dodecylamine, cyclohexylamine, benzylamine, aniline, toluidine, α-naphthylamine, and β-naphthylamine.

Among the carbonyl compounds of formulas IV and V which are most suitable for preparing the Schiff bases include acetaldehyde, propionaldehyde, isobutyraldehyde, butyraldehyde, capronaldehyde, caprylaldehyde, caprinaldehyde, tetrahydrobenzaldehyde, hexahydrobenzaldehyde, furfural, benzaldehyde, 2-methylbenzaldehyde, p-methoxybenzaldehyde, β-naphthaldehyde, acetone, methylethylketone, dibutylketone, diheptylketone, dodecylketone, dibenzylketone, acetophenone, butyrophenone, benzophenone, 2-methylacetophenone, 4-methoxypropiophenone, cyclopentanone, cyclohexanone, terephthalaldehyde, isophthalaldehyde, glyoxal, glutaraldehyde, acetonylacetone, 4,4'-diacetyldiphenylether.

The polyamide-acids of formula VIII may be prepared by reacting, generally at between 20° C and 120° C in an anhydrous polar solvent such as dimethylformamide, dimethylacetamide, dimethylsulfoxide, N-methylpyrrolidone or pyridine, a dianhydride or mixture of two dianhydrides of formula IX with an excess of diprimary diamine or a mixture of two diprimary diamines as hereinbefore defined so as to obtain a polyamide acid solution having terminal —NH₂ groupings

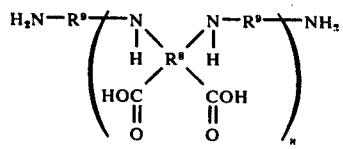

and then reacting generally between 0° C to 100° C the solution thus obtained with an unsaturated anhydride of formula XIV wherein n, D, R⁹ and R⁸ are as hereinbefore defined.

The preparation of the polyamide-acids of formula VIII is described in greater detail in U.S. Pat. Nos. 3,575,924 and 3,528,950.

The polyamide-amide acids of formula X may be prepared by reacting trimellitic anhydride or a derivative thereof, such as for example the acid chloride with an excess of a diprimary diamine or mixture of diprimary diamines as hereinbefore defined, in an anhydrous polar solvent such as dimethylformamide, N,N-dimethylacetamide, dimethylsulfoxide, N-methylpyrrolidone or pyridone so as to obtain a polyamide-amide acid solution having terminal —NH₂ groupings $$H_2N-R^9 \left( -NH-\overset{O}{\overset{\|}{C}} \overset{\phantom{X}}{\underset{\phantom{X}}{\bigcirc}} \overset{C-NH-R^9}{\underset{C-OH}{\|}} \right)_n NH_2 \quad XVI$$

and then reacting generally at between 0° and 100° C the solution thus obtained with an unsaturated anhydride of formula XIV wherein R⁹ and n are as hereinbefore defined.

The preparation of the polyamide amide acids of formula X is described in greater detail in German Pat. No. 2,120,021.

The polyamide-amide acids of formula XI may be prepared by reacting an amide dianhydride of the formula

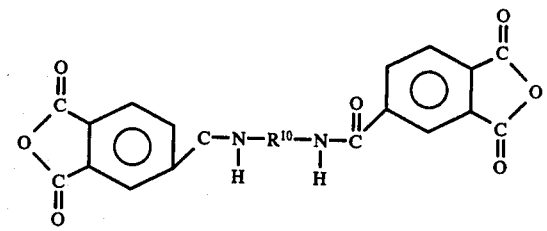

wherein R¹⁰ is as defined hereinbefore, with a molar excess of a diprimary diamine as defined hereinbefore in an anhydrous polar solvent such as dimethylformamide, dimethylacetamide, dimethylsulfoxide, N-methylpyrrolidone to obtain a polyamide-amide acid solution having terminal —NH₂ groupings $$H_2N-R^9 \left( -\overset{H}{N}-\overset{O}{\overset{\|}{C}} \overset{\phantom{X}}{\underset{HOC}{\bigcirc}} \overset{\phantom{X}}{\underset{\|}{\underset{O}{\phantom{X}}}} \overset{O}{\overset{\|}{C}}-N-R^{10}-N-\overset{O}{\overset{\|}{C}} \overset{\phantom{X}}{\underset{COH}{\bigcirc}} \overset{C-N-R^9}{\underset{H}{\|}} \right) NH_2 \quad XVII$$

and then reacting generally at between 0° C and 100° C the solution thus obtained with an olefinic unsaturated anhydride of the formula XIV wherein R¹, R⁸ and n are as hereinbefore defined and wherein R¹ and R⁸ are independent and may be the same or different.

The preparation of the polyamide-amide acid of formula XI is described in greater detail in the copending application Ser. No. 248,838.

The quantities of anhydride and diamine to prepare the resins of formulas XV, XVI and XVII are so chosen that the ratio $$\frac{\text{Number of Moles of Diamine}}{\text{Number of Moles of Anhydride}}$$

is in a range of from 2:1 to 1.01:1 and more preferably from 2:1 to 1.1:1.

The quantity of monoanhydride of formula XIV must be sufficient to introduce a number of anhydride groupings equal to the number of —NH₂ groupings of the resins of formulas XV, XVI and XVII.

The polyamide-acid precursor resins of formulas VIII, X and XI have very good solubility in polar organic solvents such as Dimethylsulfoxide
N-methyl-2-pyrrolidone
Tetramethyl urea
Pyridine
Dimethylsulfone
Hexamethylphosphoramide
Tetramethylene sulfone
Formamide
N-methylformamide
Butyrolactone Dimethylformamide
Dimethylacetamide The solvents can be used alone, in combination with other solvents, or in combination with poor solvents or non solvents such as benzene, benzonitrile, dioxane, xylene, toluene and cyclohexane.

Solutions may be prepared containing up to 50% by weight of the polyamide-acid precursor resins of formulas VIII, X and XI and Schiff base combined, The resins and Schiff base may be used directly from solution to form laminates for printed circuit boards, coatings for decorative and electrical purposes, films and adhesives. The polyamide-acid precursors and the Schiff base may be precipitated from their solutions by a diluent such as water, a hydrocarbon or a ketone such as acetone. The powders thus obtained may be further processed using conventional plastic processing methods such as compression, transfer and injection molding. Alternatively, the polyamide-acid resin precursors may be precipitated from solution and the Schiff base added to the resin powder after which the mixture is further processed.

The conversion of the polyamide acid precursors of formulas VIII, X and XI into their corresponding polyimide of formula IX and polyamide-imides of formulas XII and XIII respectively may be effected by the thermal and/or chemical means. Thus, the polyamide-acid resin precursors may be subjected to a cyclizing dehydration which consists of treating the resin with a dehydrating agent such as acetic anhydride alone or in combination with a tertiary amine catalyst such as pyridine or heating the precursor resins between 80° C and 180° C.

The Schiff bases may be added to the dry isolated powdered polyimides or the polyamide-imides by standard dry blending techniques and fabricated as discussed above. For those particular polyimides of formula IX and the polyamide-imides of formulas XII and XIII which are soluble in the aforementioned dipolar solvents, the Schiff base may be added to a solution of imidized resin and the resin fabricated into laminates, coatings, adhesives and molding compositions.

Other appropriate ingredients may be added to the compositions of this invention such as fillers, dyes, pigments, thermal and UV stabilizers and the like, depending on the end use.

It has also been found advantageous to optionally add to the compositions of this invention a curing catalyst. The curing catalyst aids in increasing the rate of cure of the compositions, thus, shortening the process time in preparing the fully cured resin. Examples of curing catalysts are compounds such as di-t-butyl peroxide, dilauryl peroxide, dicumyl peroxide, dicumyl peroxide, tert-butyl peroxide benzoate. These curing catalysts are preferably used in a concentration range from 0.01 to 5%, and particularly, from 0.25 to 1%, based on a total weight of bis-imides and Schiff base.

A second aspect of this invention concerns a composition comprising a. A polyamide-acid resin of the formula

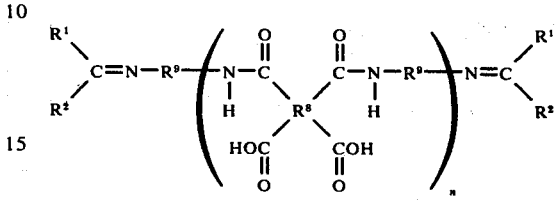

or its corresponding polyimide of the formula

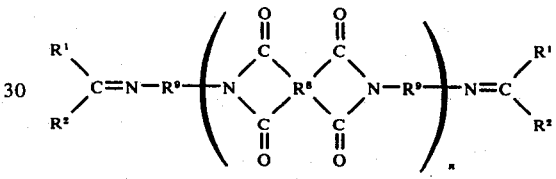

as well as a polyamide-amide acids of the formula

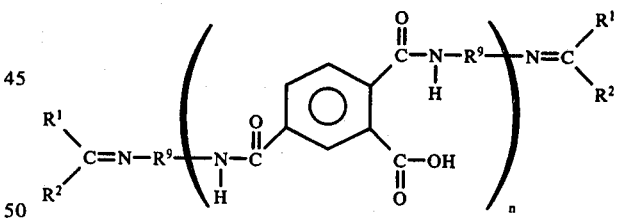

or

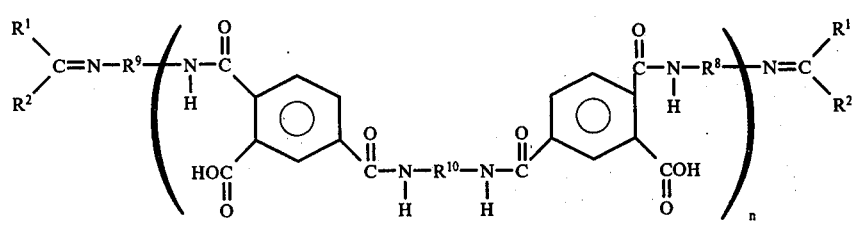

or their respective corresponding polyamide-imide of the formulas

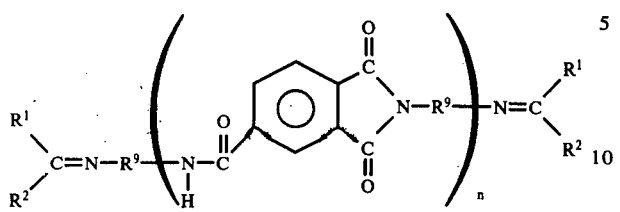

and

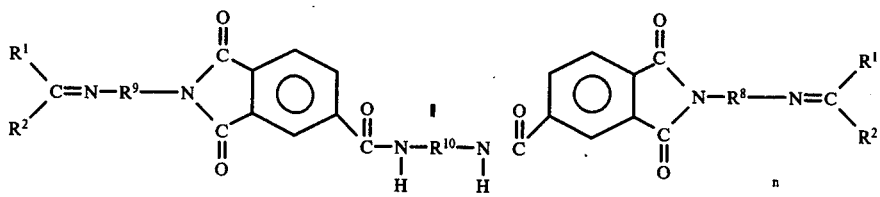

wherein $R^1$, $R^2$, $R^8$, $R^9$, $R^{10}$, and $n$ are defined previously, and b. an N,N'-bis-imide of the formula

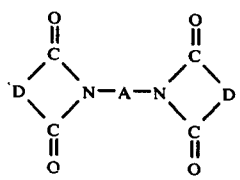

wherein A and D are as defined previously. The quantities of prepolymer and of N,N'-bis-imide are chosen in such a manner that the ratio $$\frac{\text{Number of equivalence prepolymer}}{\text{Number of equivalence N,N'-bis-imide}}$$

is between 1:2 and 1:6.

Crosslinked polymers from these compositions are obtained by heating the prepolymers and N,N'-bis-imide at a temperature of from 100° C to 350° C.

The prepolymers according to this second aspect of the invention may be prepared in the same manner used for preparing the olefinic unsaturated prepolymers except that the prepolymer of formulas XV, XVI, and XVII are reacted with an aldehyde or ketone of formula IV, i.e.,

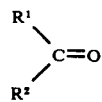

wherein $R^1$ and $R^2$ are defined previously rather than an ethylenically unsaturated anhydride of the formula XIV, i.e.,

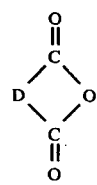

wherein D is as defined previously.

The unsaturated N,N'-bis-imides are prepared by first forming the amide-acid by reacting amines of the formula VII, i.e., $$H_2N-A-NH_2$$

wherein A is as defined hereinbefore with an unsaturated anhydride of formula XIV in an inert solvent such as chloroform at about 25° C with subsequent cyclization and dehydration of the amide-acid to the imide by thermal or chemical means. Thus, these additives may be imidized by heating the amide-acids at a temperature sufficient to effect immidization while removing the water formed by azeotropic distillation, e.g., by refluxing in toluene at 110° C, or adding acetic anhydride/pyridine mixture to the amide-acid in chloroform. The preparation of these compounds are described in more detail in U.S. Pat. Nos. 2,444,536 and 3,010,290 and copending application, Ser. No. 303,193, filed Nov. 2, 1972.

Examples of the N,N'-bis-imides are as follows:
N,N'-p-aminophenyl sulfone bis(bicyclo[2.2.1]hept-5-ene-2,3-dicarboxylic imide)
N,N'-p-aminophenylsulfide bis(5-norbornene-2,3-dicarboxylic imide)
N,N'-2,4-diaminotoluene bis(5-norbornene-2,3-dicarboxylic imide)
N,N'-m-phenylene diamine bis(5-norbornene-2,3-dicarboxylic imide)
N,N'-p-aminophenylether bis(5-norbornene-2,3-dicarboxylic imide)
N,N'-p-phenylenediamine bis(5-norbornene-2,3-dicarboxylic imide)
N,N'-m-aminophenylsulfone bis(5-norbornene-2,3-dicarboxylic imide)
1,6-diaminohexane bis(5-norbornene-2,3-dicarboxylic imide)
1,3-xylylene diamine bis(nadimide)
2,6-bis-(2-aminophenyl)aniline bis(5-norbornene-2,3-dicarboxylic imide)
4,4'-(p-aminophenyl dissulfide)bis(5-norbornene-2,3-dicarboxylic imide)
N,N'-bis 2-diphenylamino-4,6-bis(m-aminoanilino)triazine bicyclo[2.2.1]hept-5-ene-2,3-dicarboxylic imide
N,N'-p-aminophenylmethane bis(5-methyl-5-norbornene-2,3-dicarboxylic imide)

N,N'-p-aminophenylether bis(5-methyl-5-norbornene-2,3-dicarboxylic imide)

N,N'-m-phenylene diamine bis(5-methyl-5-norbornene-2,3-dicarboxylic imide)

m-phenylene diamine bis(maleimide)
   4,4'-diaminodiphenylether bis(maleimide)
   4,4'-diaminodiphenyl bis(maleimide)
   4,4'-diaminodiphenylsulfone bis(maleimide)
   4,4'-diaminodiphenylsulfide bis(maleimide)
   ethylenediamine bis(maleimide)
   4,4'-diaminodiphenylmethane bis(maleimide)
   2,4-toluenediamine bis(maleimide)
   4,4'-diaminodiphenylether bis(dichloromaleimide)
   N,N'-p-aminophenylether bis(citraconimide)
   N,N'-p-aminophenylether bis(7-oxabicyclo[2.2.1]hept-5-ene-2,3-dicarboxylic imide)

To further illustrate the nature of this invention and the process employed in preparing the cured resin, the following examples are given below.

EXAMPLE 1

Typical of the methods used to prepare the Schiff bases are as follows:

A. Preparation of 4,4'-methylenebis N-($\alpha$-methylbenzylidene)aniline

A mixture of 4,4'-methylenedianiline (198 g; 1 mole), acetophenone (240 g; 2 moles) and a catalytic amount of stannous chloride was refluxed in toluene (3L) for 30 hours using a Dean-Stark trap. The theoretical amount of water was removed from the system. The toluene was then removed under vacuum.

The residual oil crystallized immediately upon cooling. The resulting solid was ground in hexane (1.5L) in a Waring Blender, suction filtered, air dried, and finally recrystallized from methyl cellosolve (1,500 ml). The resulting yellow needles were dried for 24 hours in a vacuum oven at room temperature, and had a melting point of 116°–119° C.

B. Preparation of 4,4'-methylenebis(N-benzylidene aniline)

Benzaldehyde (212 g; 4 moles) was added in one portion to a solution of 4,4'-methylene aniline (396 g; 2 moles) in ethanol (4L) at a temperature of 40° C. The product precipitated in white plates after 5 minutes of stirring. The product was suction filtered, washed with ethanol (2L) followed by water (2L) and dried in a vacuum oven at 60° C for 24 hours. The product had a melting point of 126°–130° C.

The following three bis-Schiff bases were prepared similarly to 4,4'-methylenebis(N-benzylidene aniline)

a. N,N'-dibenzylidene-m-phenylenediamine m.p. 109°–110° C
  b. N,N'-dibenzylidene-p-phenylenediamine m.p. 139°–140° C
  c. glyoxal bis-(4-methoxy-anil) m.p. 153°–157° C.

C. Preparation of N,N'-dibenzylidene ethylenediamine

A mixture of ethylene diamine (12.02 g; 0.2 mole) and benzaldehyde (42.44 g; 0.4 mole) in toluene (200 ml) was refluxed for 4 hours using a Dean-Stark trap. The toluene was then removed under vacuum. The residual oil crystallized on cooling. The resulting product was dried in a vacuum oven for 24 hours at room temperature and had a melting point of 52°–54° C.

D. Preparation of N,N'-Dimethyl terephthaldimine

A solution of monomethylamine (254 g; 6.0 moles) in benzene (500 ml) was added to terephthaldehyde (74.48 g; 0.6 mole) in benzene (210 ml) at a temperature of 10° C. An exotherm to 40° C resulted and the solution became homogeneous. Stirring at room temperature for one hour followed by refluxing for 18 hours using a Dean-Stark trap, filtration and cooling afforded a white crystalline precipitate which had a melting point of 92° to 98° C.

EXAMPLE 2

Citraconic anhydride (112.08 g; 1 mole) followed by dimethylformamide (90 ml) was added to a stirred solution of 4,4'-bis-o-chloroaniline (267.16 g; 1 mole) in dimethylformamide (450 ml) and a nitrogen atmosphere at room temperature. The mixture was stirred for 30 minutes. A slurry of 3,3',4,4'-benzophenonetetracarboxylic dianhydride (161.11 g; 0.5 moles) in dimethylformamide (260 ml) was then added and the polyamic acid was allowed to form over a period of about 16 hours. Imidization was effected through acetic anhydride (267 ml) addition followed by pyridine (122 ml), and steam bath heating for four hours.

Coagulation from water in a Waring Blendor, filtration, resuspension in water, filtration and vacuum drying at 90° C for 24 hours afforded a powder with a softening point of 195°–200° C.

To the resin powder obtained was added N,N'-dimethyl terephthaldimine in a ratio of 2 moles of resin to 1 mole of Schiff base.

The composition thus obtained softened in the range of from 165° to 180° C.

The resin composition had a gel time of one minute at 200° C and when cured for 90 minutes at 300° C had a glass transition temperature as determined by Torsional Braid analysis of 320° C. Solutions of this composition containing 40% solids in tetrahydrafuran and 40% dimethylformamide respectively had a varnish storage stability of longer than 1 month.

EXAMPLE 3

A lay-up of 12 plies of 181E A1100 glass cloth was impregnated with the tetrahydrofuran varnish solution prepared according to Example 3. The prepeg resin content was 31.1%, volatile content 8.1%. The lay-up was heated in a simulated autoclave to 212° F under vacuum and was "B" staged at 212° F for 1 hour under vacuum. A pressure of 90 psi was then applied and the temperature was raised to 400° F over a period of 63 minutes with vacuum assist. The system was then cured for 2 hours at 400° F, 90 psi, under vacuum and cooled under restraint.

The laminate was post-cured unrestrained from room temperature to 305° C (581° F) over a 24 hour period.

The resulting laminate had a resin content of 36.8% a void content of 2.8% and a specific gravity of 1.82g/cc.

PHYSICAL DATA:

|  | Cure (psi) Room Temp. | After Post Cure (psi) Room Temp. | 550° F |
|---|---|---|---|
| Flexural Strength | $1.66 \times 10^4$ | $3.36 \times 10^4$ | $2.75 \times 10^4$ |
| Flexural Modulus | $2.16 \times 10^6$ | $1.39 \times 10^6$ | $1.51 \times 10^6$ |
| Short Beam Shear | $1051 \pm 43$ | $3655 \pm 240$ | $3114 \pm 204$ |

The flexural strength and flexural modulus was determined according to ASTM Standard D790 and the Short Beam Shear Strength was determined according to ASTM Standard D2344.

EXAMPLE 4

Citraconic anhydride (86.6 g; 0.8 mole) followed by dimethylformamide (70 ml) was added to a stirred solution of 4,4'-methylenebis(o-chloroaniline) (267 g; 1 mole) in dimethylformamide (450 ml) in a nitrogen atmosphere at room temperature. The mixture was stirred for 45 minutes. A slurry of 3,3'-4,4'-benzophenonetetracarboxylic acid dianhydride (193 g; 0.6 mole) in dimethylformamide (300 ml) was then added and the polyamic acid was allowed to form over a 16 hour period.

Imidization was effected by acetic anhydride (667 ml) addition followed by pyridine (222 ml), and steam bath heating for 4 hours.

Coagulation from water in a Waring Blendor, filtration, resuspension in water, filtration, and vacuum oven drying at 90° C for 24 hours afforded a resin powder with a softening point of 195°–200° C.

To the resin powder was added 4,4'-methylenedianiline di-benzilidine (2 to 1 mole ratio of resin to Schiff base). The resin and Schiff base were mixed thoroughly and the resultant composition had a softening point of 185° C and a glass transition temperature of 295° C after heating for 30 minutes at 350° C as determined by Torsional Braid analysis. The composition was soluble as a 40% solid solution in both tetrahydrafuran and dimethylformamide respectively and the solutions were stable on storage at room temperatures for greater than 4 months.

EXAMPLE 5

A lay-up of 12 plies of 181E A1100 glass cloth was impregnated with a 40% solids tetrahydrofuran varnish solution prepared according to Example 4. The prepreg resin content was 36.7% and the volatiles content was 8.8%.

The lay-up was heated in a simulated autoclave to 130° C under vacuum and was B staged at 130° C (292° F) for 1 hour under vacuum. The system was then heated from 130° C (292° F) to 400° F at a rate of 3° F/min. over a 44 minute period. A pressure of 90 psi was applied at 320° F. The system was cured for 2 hours at 400° F, 90 psi, under vacuum and cooled under restraint. The laminate was postcured unrestrained over a 24 hour period from room temperature to 305° C (581° F).

The resulting laminate had a resin content of 24.5%, a void content of 0.44, and a specific gravity of 2.03 g/cc.

Laminate short beam shear before postcure was 2,300 psi at room temperature; after postcure short beam shear was 2,600 psi at both room temperature and 550° F.

EXAMPLE 6 a. Preparation of polyamic acid

To a solution of 4,4'-methylenedianiline (19.8 g; 0.1 mole) in dimethylformamide (40 ml) was added citraconic anhydride (11.2 g; 0.1 mole) followed by dimethylformamide (5 ml). The solution was allowed to stir for 1 hour under nitrogen. A slurry of 3,3',4,4'-benzophenonetetracarboxylic dianhydride (BTDA) (16 g; 0.05 mole) in dimethylformamide (25 ml) was then added and the resulting solution (40% solids) was allowed to stir for about 16 hours under nitrogen.

b. Preparation of laminates

To 640.8 g of a 40% dimethylformamide (DMF) solution of this amic acid is added N,N'-dimethylterephthaldimine (80.1 g; 0.5 mole) in the molar ratio of 2:1. Glass cloth 181E A1100 is impregnated with this DMF solution. A lay-up of 12 plies of cloth (6 × 6 inches per ply) is prepared. The lay-up is heated in a simulated autoclave to 150° C (302° C) under vacuum and "B" stage at 150° C for 1 hour. A pressure of 90 psi is applied and the temperature is raised to 204° C (400° F) with vacuum assist. The laminate is cured at 204° C (400° F), 90 psi, under vacuum for 2 hours. The laminate is cooled under restraint.

EXAMPLE 7

To the resin powder prepared according to Example 4 was added 4,4'-methylene-bis[N-(α-methyl benzilidine)aniline] in a ratio of 3 moles of resin powder to 1 mole of Schiff base. After thorough mixing, the resin composition had a softening point of 185° C and a glass transition temperature of 300° C when cured for 30 minutes at 350° C as determined by Torsional Braid analysis.

After 552 hours at 300° C, the composition retained 76% of its original weight.

EXAMPLE 8

A flask is charged under a nitrogen atmosphere with 59.4 g of 4,4'-methylenedianiline, 70 ml of dimethylformamide and stirred until the reaction mixture becomes homogeneous. To this mixture is added a slurry containing 64.4 g of 3,3',4,4'-benzophenonetetracarboxylic acid dianhydride in 100 ml of dimethylformamide. To the mixture is added 32.8 g of Nadic anhydride. To this stirred reaction mixture is added 0.1 mole of N,N'-dibenzylidene ethylenediamine. The reaction is continued for 4 hours. A portion of the resin is precipitated from solution by coagulation in water. The resin powder thus obtained may be molded in a cavity mold at 500° F and a pressure of 3,000 psi.

EXAMPLE 9 p-Phenylenediamine is reacted with acetic anhydride to form the following compound:

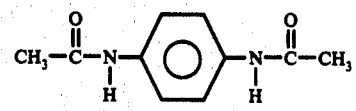

This compound is then reacted with two molar equivalents of trimellitic anhydride to form the following dianhydride compound:

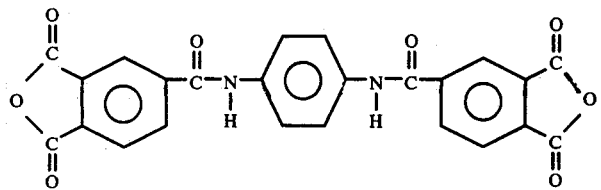

4,4'-methylenedianiline is reacted with this dianhydride and Nadic anhydride in dimethylformamide and at about 25° C, all compounds being at equivalence to yield the polyamic acid precursor having the formula

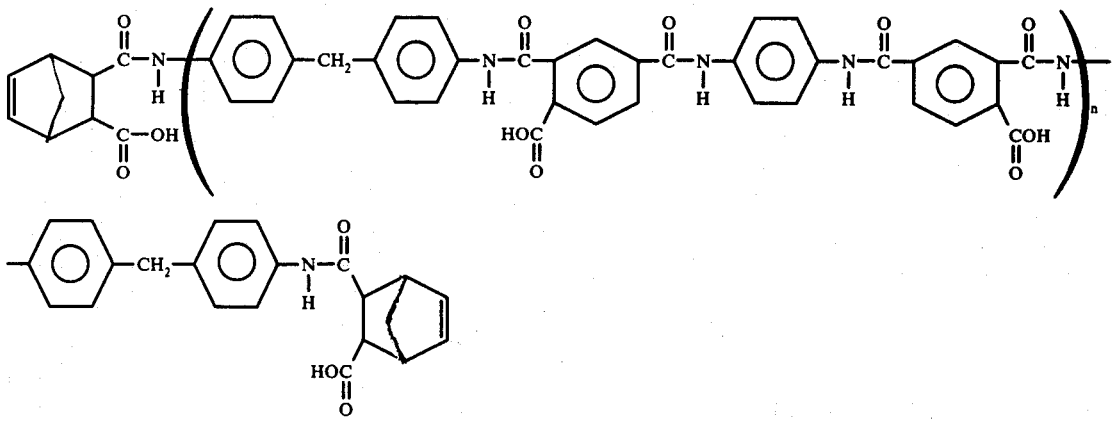

Upon heating the above polyamic acid precursor to temperatures of about 200° C, the following polyamide imide is formed:

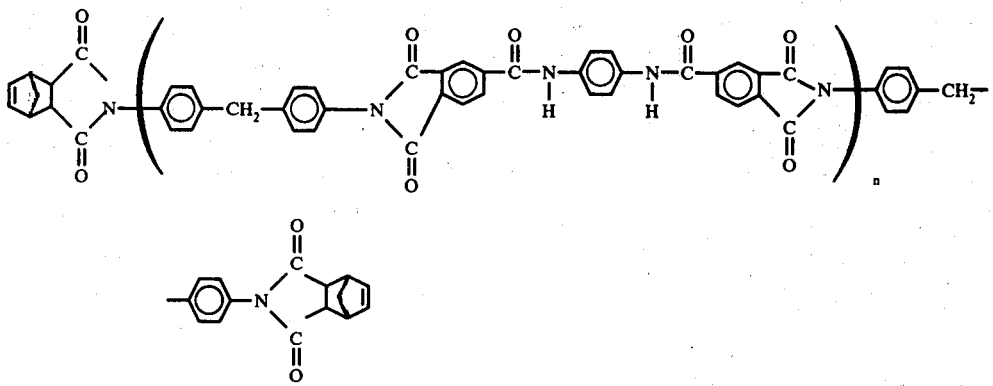

The polyamic acid can also be converted to the polyamide imide by treating the polyamic acid with pyridine/acetic anhydride mixture. The polyamide-imide powder is obtained by coagulation of the polymer solution in water.

The polymer powder when dry mixed separately with each of the following Schiff base compounds at a mole ratio of 2 to 1 respectively
  a. 4,4'-methylenebis(N-benzylidene aniline)
  b. N,N'-dibenzylidene-m-phenylenediamine
  c. Glyoxal bis-(4-methoxy-anil)
  d. N,N'-dibenzylidene ethylenediamine
  e. N,N'-Dimethyl terephthaldimine will yield resins which soften at a lower temperature than the base resin which does not contain the Schiff base compound. The compositions may be molded at 260° C for 1 hour at 3000 psi to yield hard, infusible products.

In a similar manner, if one substitutes the reaction product of p-phenylenediamine, and acetic anhydride in the above reaction with the compound resulting from the reaction of 4,4'-methylenedianidine and acetic anhydride, i.e.,

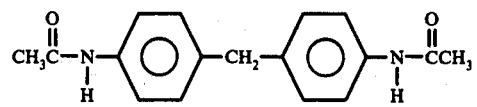

a polyamide imide is obtained having the formula

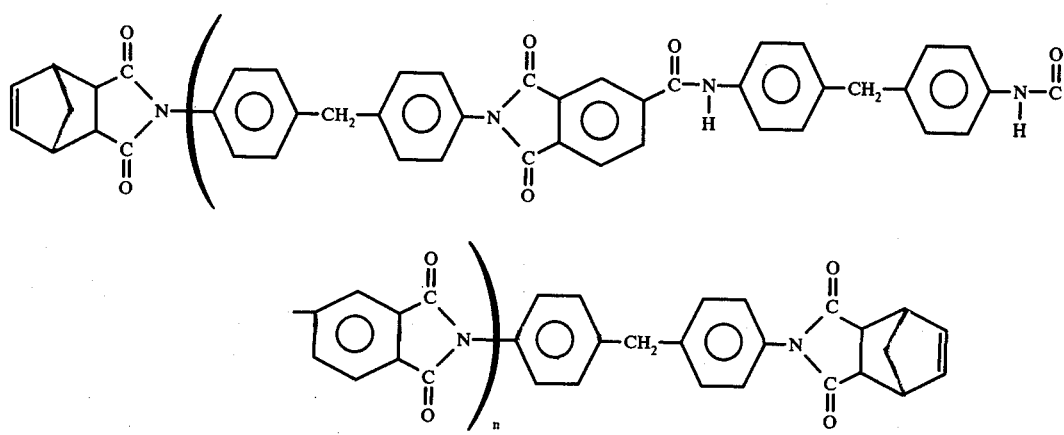

The polymer powder when dry mixed separately with each of the following Schiff base compounds at a mole ratio of 3 to 1 for (a) and 2 to 1 for (b), (c) and (d) respectively a. 4,4'-methylenebis[N-(α-methyl-benzylidene)aniline]
b. 4,4'-methylenebis(N-benzylidene aniline)
c. Glyoxal bis-(4-methoxy-anil)
d. N,N'-Dimethyl terephthaldimine will yield resins which soften at a lower temperature than the base resin which does not contain the Schiff base compound. The compositions may be molded at 260° C for 1 hour at 3,000 psi to yield hard, infusible products.

EXAMPLE 10

To a 3 liter flask, under a nitrogen atmosphere, is added 98.14 gm of 4,4'-methylenedianiline, 500 ml dimethylacetamide and 54.17 gm of Nadic anhydride. To the reaction mixture is added 69.49 gm of solid trimellitic acid chloride and 325 ml of dimethylacetamide. Stirring is continued for about 16 hours at 25° C after which 250 ml of acetic anhydride and 340 ml of pyridine is added to the reaction mixture. A clear solution of the polyamide-imide is obtained. The polymer is coagulated in water and dried for 20 hours at 70° C under a vacuum of 70 mm of mercury.

Portions of the resin powder are dry mixed separately with each of the following Schiff base compounds (2 to 1 mole ratio of resin to Schiff base).

a. 4,4'-methylenebis(N-benzylidene aniline)
b. N,N'-dibenzylidene ethylenediamine
c. N,N'-dimethyl terephthaldimine Each of the compositions when heated to 210° C for 1 hour gives hard, infusible cured products. Each of the compositions when blended with 50% Daper (powdered quartz) may be molded at 500° F (260° C) for 1 hour at 3,000 psi to hard, infusible products.

EXAMPLE 11

To 400 ml of methyl cellosolve under a nitrogen atmosphere at 25° C is added 74.3 gm. 4,4'-methylenedianiline, 205.9 gm of 2-diphenylamino-4,6-bis(m-aminoanilino)-s-triazine and 82.0 gm of Nadic anhydride. To the slurry is added 125 ml of methyl cellosolve to wash in the previous materials. A slurry containing 75 ml of methyl cellosolve and 161.0 gm of 3,3',4,4'-benzophenonetetracarboxylic dianhydride is added to the reaction mixture followed with an additional 40 ml of methyl cellosolve. The mixture is stirred for about 16 hours after which a clear viscous solution containing 45% solids is obtained.

To the solution is added 25 gms of 4,4'-methylenebis(N-benzylidene aniline). Laminates with good mechanical properties may be prepared from this solution by conventional autoclave techniques. Laminates may be prepared as follows:

A Sauter prepregging oven is threaded with a six inch wide tape of 181 E style glass cloth with A1100 finish and the oven is equilibrated at 110° C. The tape is passed into a coating trough containing the varnish. From the trough the tape is passed through a nip role set at a gap of 30 mil., through the oven (residence time 10 min.), and on to a tape up roll.

The prepregs prepared are then cut into 6 × 6 inches pieces and stacked 12 ply deep. The stock is placed in the autoclave and processed as follows: The autoclave is evacuated to a 29 inches vacuum and heated rapidly to 165° C and held 45 minutes at this temperature. The autoclave is pressurized to 200 psi with $N_2$ and the temperature increased rapidly to 238° C. The temperature is raised at 1° C/min. from 232° C to 260° C and held 1 hour at 260° C. The autoclave is cooled to room temperature under 200 psi pressure and the samples were withdrawn.

EXAMPLE 12

Preparation of a Schiff Base Terminated Imidized Prepolymer

To a solution of 240.5 g (0.9 mole) of 4,4'-methylenebis-(o-chloroaniline) in 650 ml of dimethylformamide is added portionwise and at room temperature 193.4 g (0.6 mole) of 3,3',4,4'-benzophenonetetracarboxylic dianhydride. The solution is stirred for 18 hours at room temperature. Benzaldehyde (31.8 g; 0.6 mole) is added and an additional 50 ml of dimethylformamide. The reaction mixture is heated for 4 hours at 135°–142° C while water and some solvent are distilled off. The mixture is cooled to room temperature and poured into 5 liters of methanol. The resulting precipitate is filtered, washed with 1.5 liters of methanol and dried at 160° C at 0.5 mm Hg for 48 hours.

The above imidized prepolymer may be combined to form separate solutions with each of the following N,N'-bis-imides in the ratio of 1 mole of resin to 2 moles of N,N'-bis-imide:

a. Maleic N,N'-4,4'-diphenyl ether-bis-imide
b. Maleic N,N'-4,4'-diphenyl-bis-imide
c. Maleic N,N'-4,4'-diphenyl sulfone-bis-imide
d. Maleic N,N'-4,4'-diphenyl sulfide-bis-imide e. Maleic N,N'-ethylene-bis-imide
f. Maleic N,N'-diphenylmethane-bis-imide
g. Citraconic N,N'-diphenylmethane-bis-imide
h. Maleic N,N'-metaphenylene-bis-imide The resulting mixture is then blended with 50% Daper (powdered quartz) and used in press molding applications. The molding compound is advanced by heating at 350° F (177° C) for 5 minutes. It is molded to yield hard infusible products at 450° F (232° C) for 1 hour under a pressure of 3,000 psi. It is post-cured by heating to 580° F (304° C) over a period of 22 hours and at 580° F for 2 hours.

A laminating varnish of the above prepolymer may be made by combining the prepolymer separately with each of the following N,N'-bis-imides:
a. Maleic N,N'-2,4-toluene-bis-imide
b. Dichloromaleic N,N'-4,4'-diphenylether-bis-imide
c. Dimethylmaleic N,N'-paraphenyl ether-bis-imide
d. Itaconic N,N'-paraphenyl ether-bis-imide
e. Citraconic N,N'-diphenylmethane-bis-imide
f. Maleic N,N'-metaphenylene-bis-imide
g. Maleic N,N'-diphenylmethane-bis-imide
in a 1 to 2 mole ratio respectively in tetrahydrofuran (50% solids). The varnish is coated onto 181E A1100 fiberglass and is cut into plies 6 × 6 inches. A lay-up of 12 plies is heated in a simulated autoclave to 150° C (302° F) under vacuum and is B staged at 150° C for 1 hour. A pressure of 90 psi is then applied and the temperature is raised to 204° C (400° F) with vacuum. The laminate is cured at 204° C, 90 psi for 2 hours. Post-cure is effected by heating to 580° F (304° C) over a 22 hour period and then heating at 580° F (304° C) for 2 hours.

EXAMPLE 13

Preparation of Schiff Base Terminated Polyamic Acid

To a stirred solution of 4,4'-methylenedianline (287 g; 1.5 moles) in dimethylformamide (1650 g; 1740 ml) is added portionwise and at room temperature 3,3',4-,4'-benzophenonetetracarboxylic dianhydride (322 g; 1 mole). The resulting mixture is stirred for 3 hours at room temperature. Benzaldehyde (63 g; 1 mole) is added and stirring is continued for one hour. This procedure yields a prepolymer solution with 40% solids.

The above varnish solution may be used as a laminating varnish using the following procedure. Add the appropriate N,N'-bis-imide in the required mole ratio (1 to 2 of resin to N,N'-bis-imide) and stir until a homogeneous solution results. A lay-up of 12 plies of 181E A100 glass cloth impregnated with the DMF varnish is made up and heated in a simulated autoclave to 150° C (302° F) under vacuum. It is then B staged at 150° C for one hour. A pressure of 90 psi is applied and the temperature is raised to 204° C (400° F) with vacuum assist. The laminate is cured at 204° F, 90 psi, under vacuum for 2 hours. The system is cooled under restraint.

N,N'-bis-imides which may be used to prepare the laminates include the following:
a. Maleic N,N'-4,4'-diphenylether-bis-imide
b. Maleic N,N'-4,4'-diphenyl-bis-imide
c. Maleic N,N'-4,4'-diphenylsulfone-bis-imide
d. Maleic N,N'-4,4'-diphenyl sulfide-bis-imide
e. Maleic N,N'-ethylene-bis-imide
f. Maleic N,N'-diphenylmethane-bis-imide
g. Maleic N,N'-2,4-toluene-bis-imide
h. Dichloromaleic N,N'-4,4'-diphenylether-bis-imide
i. Dimethylmaleic N,N'-paraphenylether-bis-imide
j. Itaconic N,N'-paraphenylether-bis-imide
k. Citraconic N,N'-diphenylmethane-bis-imide
l. Maleic N,N'-metaphenylene-bis-imide

EXAMPLE 14

Preparation of a Schiff Base Terminated Polyamide Imide Prepolymer

To a solution of 4,4'-methylenedianiline (148.5 g; 0.75 mole) in dimethylformamide (675 ml) is added in one portion solid trimellitic acid chloride (105.3 g; 0.50 moles) at room temperature. The mixture is stirred for 18 hours at room temperature. Benzaldehyde (26.5 g; 0.50 mole) is added together with an addition 25 ml of dimethylformamide. The mixture is heated at 140° C for 4 hours while water and some solvent are distilled off. The prepolymer is coagulated by pouring the cooled mixture into methanol in a blendor. The precipitate is filtered, washed with methanol and dried at 100° C at 0.5 mm Hg for 24 hours.

Portions of the above resin powder are dry mixed separately with each of the following N,N'-bis-imide compounds (1 to 2 mole ratio of resin to N,N'-bis-imide).
a. Maleic N,N'-4,4'-diphenylether-bis-imide
b. Maleic N,N'-4,4'-diphenyl-bis-imide
c. Maleic N,N'-4,4'-diphenylsulfone-bis-imide
d. Maleic N,N'-4,4'-diphenylsulfide-bis-imide
e. Maleic N,N'-ethylene-bis-imide
f. Maleic N,N'-diphenylmethane-bis-imide
g. Maleic N,N'-2,4-toluene-bis-imide
h. Dichloro maleic N,N'-4,4'-diphenylether-bis-imide
i. Dimethylmaleic N,N'-paraphenylether-bis-imide
j. Itaconic N,N'-paraphenylether-bis-imide
k. Citraconic N,N'-diphenylmethane-bis-imide
l. Maleic N,N'-metaphenylene-bis-imide Each of the compositions when blended with 50% Daper (powdered quartz) may be molded at 450° F for 1 hours at 3,000 psi to give hard, infusible products.

EXAMPLE 15

Preparation of a Citraconimide Terminated Polyamide Imide

Citraconic anhydride (112 g; 1 mole) followed by dimethylformamide (70 ml) is added to a stirred solution of 4,4'-methylenedianiline (297 g; 1.5 moles) in dimethylformamide (550 ml) at room temperature in a nitrogen atmosphere. The mixture is stirred for 45 minutes. Solid trimellitic acid chloride (211 g; 1 mole) is added in one portion and stirring is continued under nitrogen for 6 hours. At this point, the polyamide amic acid is obtained in a 50% solids solution.

To effect imidization, acetic anhydride (225 ml) and pyridine (300 ml) are added at room temperature and the mixture is stirred overnight. The polyamide imide is coagulated from hot water in a blendor, filtered, rewashed with hot water in a blendor and finally filtered and dried at 70° C, 150 mm Hg for 2 hours.

The above may be used as the polyamide amic acid solution or as the polyamide imide powder together with the following Schiff Base compounds (2 to 1 mole ratio of resin to Schiff Base)
a. 4,4'-methylene-bis(N-benzylidene aniline)
b. N,N'-dibenzylidene ethylenediamine
c. N,N'-dimethyl terephthaldimine The polyamide amic acid solution plus the Schiff Base mixture may be used as a laminating varnish. The polyamide imide powder plus the Schiff Base mixture may be used as a molding powder. In the later case, blending with 50% Daper (powdered quartz) and molding at 450° F (232° C) for one hour at 3,000 psi will afford hard, infusible products.

EXAMPLE 16 p-Phenylenediamine is reacted with acetic anhydride to form the following compound:

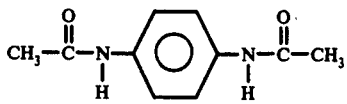

This compound is then reacted with two molar equivalents of trimellitic anhydride to form the following dianhydride compound:

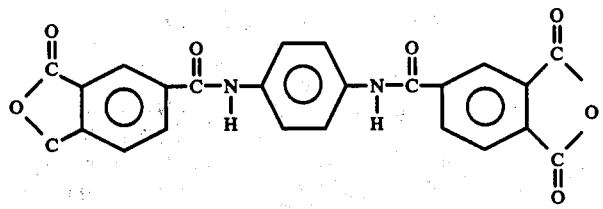

4,4'-methylenedianiline is reacted with this dianhydride and benzaldehyde in dimethylformamide at about 25° C, all compounds being at equivalence to yield the polyamic acid precursor having the formula

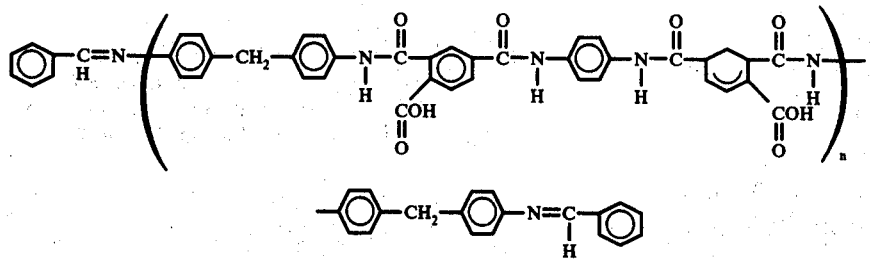

Upon heating the above polyamic acid precursor to temperatures of about 200° C, the following polyamide-imide is formed:

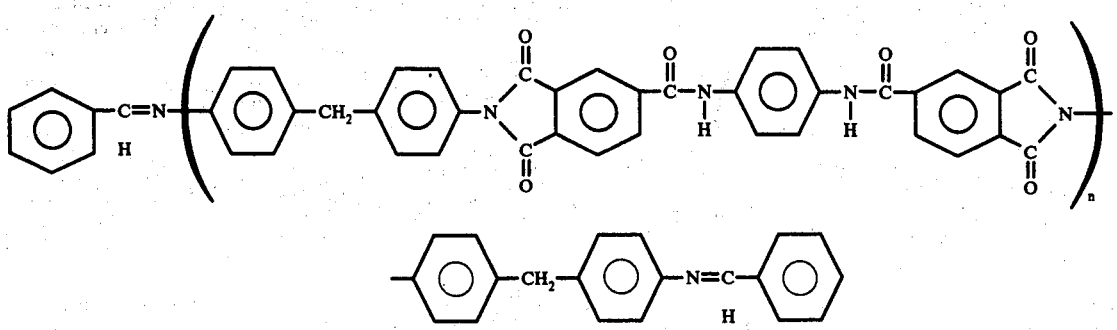

The polyamic acid can also be converted to the polyamide imide by treating the polyamic acid with pyridine/acetic anhydride mixture. The polyamide imide powder is obtained by coagulation of the polymer solution in water.

The polymer powder when dry is mixed separately with each of the following N,N'-bis-imides at a mole ratio of 1 to 2 respectively.
a. Maleic N,N'-4,4'-diphenylether-bis-imide
b. Maleic N,N'-4,4'-diphenyl-bis-imide
c. Maleic N,N'-4,4'-diphenylsulfone-bis-imide
d. Maleic N,N'-4,4'-diphenylsulfide-bis-imide
e. Maleic N,N'-ethylene-bis-imide
f. Maleic N,N'-diphenylmethane-bis-imide
g. Maleic N,N'-2,4-toluene-bis-imide
h. Dichloromaleic N,N'-4,4'-diphenylether-bis-imide
i. Dimethylmaleic N,N'-paraphenylether-bis-imide
j. Itaconic N,N'-paraphenylether-bis-imide
k. Citraconic N,N'-diphenylmethane-bis-imide
l. Maleic N,N'-metaphenylene-bis-imide to give resins which soften at a lower temperature than the base resin which does not contain the N,N'-bis-imide compound. The compositions may be molded at 450° F (232° C) for 1 hour at 3,000 psi to yield hard, infusible products.

In a similar manner, if one substitutes the reaction product of p-phenylenediamine and acetic anhydride in the above reaction with the compound resulting from the reaction of 4,4'-methylenedianiline and acetic anhydride, i.e.,

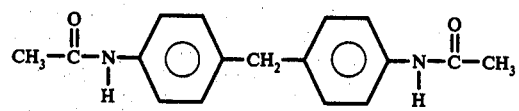

A polyamide imide is obtained having the formula

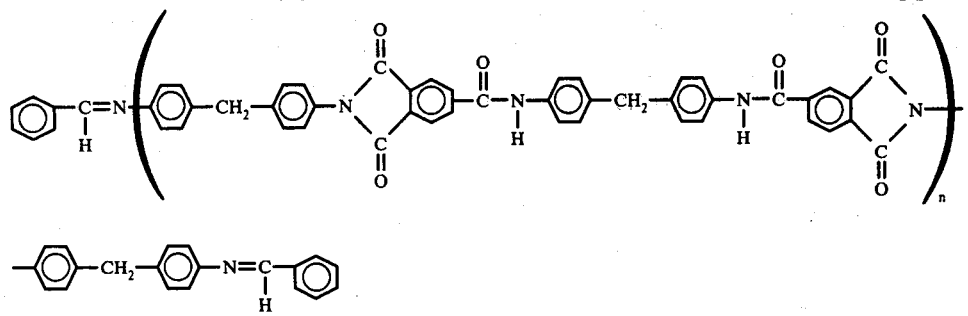

The polymer powder when dry is mixed separately with each of the aforementioned N,N'-bisimides in the mole ratio of 1 to 2 respectively to yield resins which soften at a lower temperature than the base resin which does not contain the N,N'-bis-imide compound. The compositions may be molded at 450° F (232° C) for 1 hour at 3,000 psi to yield hard, infusible products.

What is claimed is:
1. A composition of matter consisting essentially of
a. a polyimide resin having the formula

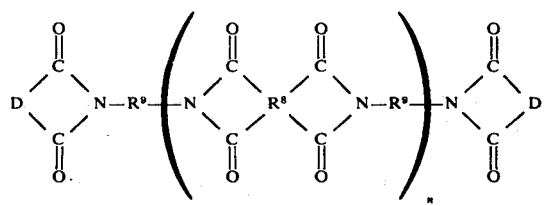

or a polyamide-imide resin having the formulas

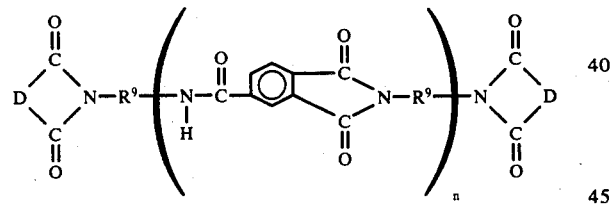

and

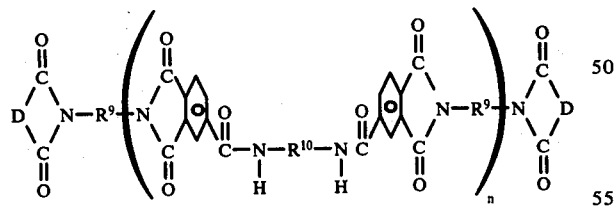

wherein
$R^8$ is a tetravelent aliphatic, cycloaliphatic, aromatic or heterocyclic radical containing at least 2 carbon atoms;
$R^9$ and $R^{10}$ are the same or different and each is an alkylene group containing from 2 to 12 carbon atoms; a cycloalkylene group containing from 4 to 6 carbon atoms; and arylene group selected from phenylene, xylylene, tolylene, biphenylene, naphthylene, substituted arylene groups of the formula

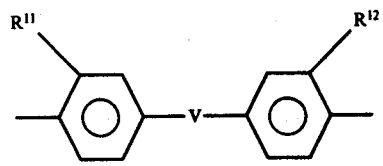

wherein V is sulfur, carbonyl, —NH, —N— (lower)alkyl, —SS—, —o—, —N-phenyl, sulfonyl, an alkylene group of from 1 to 4 carbon atoms, a di (lower)alkyl silyl group containing from 1 to 5 carbon atoms, a diphenylsilyl group, —P(O) (lower)alkyl, said lower alkyl containing from 1 to 5 carbon atoms, —N=N—,

$R^{11}$ and $R^{12}$ are indepent and each is hydrogen, chloro, or bromo, a (lower)alkyl group containing from 1 to 5 carbon atoms, a (lower) alkoxy group containing from 1 to 5 carbon atoms or a group having the formula

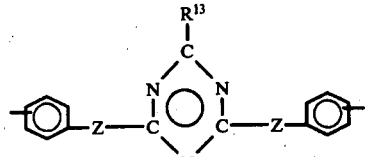

where Z is a covalent bond or —NH, and $R^{13}$ is phenyl, piperidino, H, diphenylamino or di(lower)alkyl amino;
n is an integer of at least 1;
D is a divalent radical containing olefinic unsaturation selected from the group having the formula

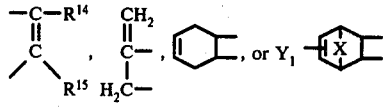

wherein
$R^{14}$ and $R^{15}$ independently of each other is hydrogen, methyl, bromo or chloro;
$Y_1$ is hydrogen or methyl
X is carbonyl, oxygen, methylene, or sulfur, and
b. from about 0.5 to about 0.166 mole equivalents per mole equivalent of (a) of a Schiff base compound of the formula

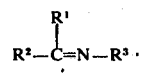 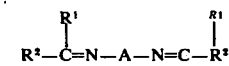

or

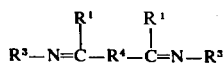

wherein
- R¹ and R² independently is hydrogen, an alkyl group containing from 1 to 12 carbon atoms, an aryl group containing from 6 to 12 carbon atoms, an alkaryl group containing from 7 to 15 carbon atoms, ar aralkyl group containing from 7 to 15 carbon atoms, chlorophenyl, alkoxyphenyl, said alkoxy containing from 1 to 5 carbon atoms, or together with the carbon to which they are attached form a monocyclic ring containing 5 to 6 carbon atoms, with the proviso that only one of R¹ or R² may be hydrogen at the same time; R³ is an alkyl group containing from 1 to 12 carbon atoms, an aryl group containing from 6 to 12 carbon atoms, an alkaryl group containing from 7 to 15 carbon atoms, an aralkyl group containing from 7 to 15 carbon atoms, chlorophenyl, alkoxyphenyl, said alkoxy containing from 1 to 5 carbon atoms, cyclohexyl or cyclophentyl;
- R⁴ is an alkylene group containing from 2 to 12 carbon atoms, phenylene, tolylene, biphenylene, naphthylene, or a arylene group having the formula

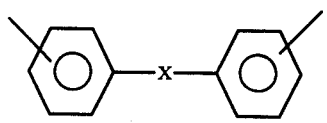

wherein X is —S—, —O—, NH, H-phenyl, sulfonyl, or an alkylene group containing from 1 to 4 carbon atoms; and
- A is an alkylene group containing from 2 to 12 carbon atoms; cycloalkylene group containing from 4 to 6 carbon atoms, a xylylene group, an arylene group selected from phenylene, tolylene, biphenylene, naphthylene, a substituted arylene group of the formula

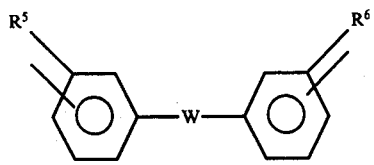

wherein W is sulfur, carbonyl, —NH, —N(lower)alkyl, —O—, —N-phenyl, sulfonyl, an alkylene group of from 1 to 4 carbon atoms, R⁵ and R⁶ are independent and each is hydrogen, chloro, or bromo, (lower)alkyl of from 1 to 5 carbon atoms, (lower)alkoxy containing from 1 to 5 carbon atoms, or a group having the formula

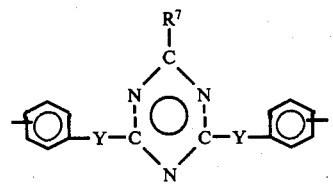

wherein Y is a covalent bond or —NH, and R⁷ is phenyl, piperidino, hydrogen, diphenylamino or di (lower)alkyl amino.

2. A composition according to claim 1 which further contains from 0.01% to 5%, based on a total weight of bis-imides and Schiff base, of a peroxide curing catalyst.

3. A composition according to claim 1 wherein
- R¹ and R² independently are hydrogen, an alkyl group containing from 1 to 12 carbon atoms, phenyl group, tolyl, chlorophenyl, or alkoxyphenyl, said alkoxy containing from 1 to 5 carbon atoms, with the proviso that only one of R¹ and R² may be hydrogen at the same time;
- R³ is alkyl group containing from 1 to 12 carbon atoms, phenyl group, tolyl, chlorophenyl, or alkoxyphenyl, said alkoxy containing from 1 to 5 carbon atoms;
- R⁴ is alkylene containing from 2 to 12 carbon atoms phenylene, tolylene, biphenylene, or a group having the formula

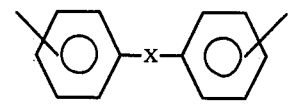

wherein X is O, sulfonyl or alkylene containing from 1 to 4 carbon atoms;
A is an alkylene group containing from 2 to 12 carbon atoms; cycloalkylene group containing from 4 to 6 carbon atoms, xylylene group, an arylene group selected from phenylene, tolylene, biphenylene, naphthylene, a substituted arylene group of the formula

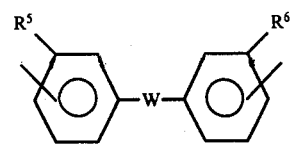

wherein W is sulfur, carbonyl, —NH, N-(lower)alkyl, —O—, —N-phenyl, sulfonyl, an alkylene group of from 1 to 4 carbon atoms, R⁵ and R⁶ are independent and each is hydrogen, chloro, or bromo, (lower) alkyl of from 1 to 5 carbon atoms, (lower) alkoxy containing from 1 to 5 carbon atoms, or a group having the formula

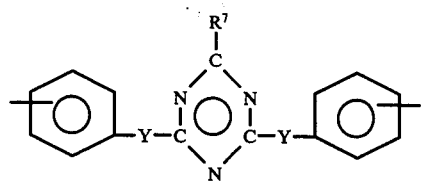

where Y is a covalent bond or —NH, and R⁷ is phenyl, piperidino, hydrogen, diphenylamino or di (lower)alkyl amino.

4. A composition according to claim 3 wherein
a. is a polyimide resin where
R⁹ is meta or para-phenylene, a group having the formula

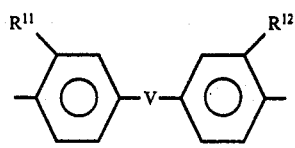

wherein V is methylene, S or O,
R¹¹ or R¹² are independent and each is a chloro or hydrogen; or a group having the formula

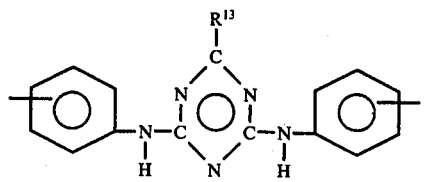

where R¹³ is diphenylamino or di(lower)alkyl amino
R⁸ has the formula

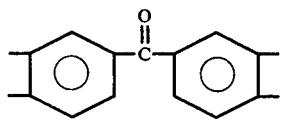

n is an integer of from 2 to 15; and
b. is a Schiff base of the formula

wherein
R¹ and R² independently is hydrogen, an alkyl group containing from 1 to 12 carbon atoms, phenyl, tolyl, chlorophenyl, or alkoxyphenyl, said alkoxy containing from 1 to 5 carbon atoms, with the proviso that only one of R¹ and R² may be hydrogen at the same time;
R³ is alkyl of 1 to 12 carbon atoms, phenyl, or tolyl;
R⁴ is alkylene of 2 to 12 carbon atoms, or phenylene.

5. A composition according to claim 3 wherein
a. is a polyamide-imide resin where
R⁹ and R¹⁰ are meta or para phenylene or a group having the formula

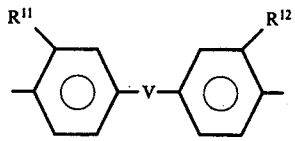

wherein V is methylene, S or —O—,
R¹¹ and R¹² are independent and each is chloro or hydrogen
b. is Schiff base of the formula

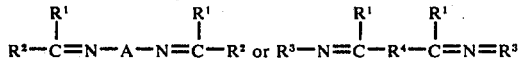

wherein
R¹ and R² independently is hydrogen, an alkyl group containing from 1 to 12 carbon atoms, phenyl group, tilyl, chlorophenyl, or alkoxyphenyl, said alkoxy containing from 1 to 12 carbon atoms, phenyl group, tolyl, chlorophenyl, or alkoxyphenyl, said alkoxy containing from 1 to 5 carbon atoms, with the pr viso that only one of R¹ and R² may be hydrogen at the same time;
R³ is alkyl of 1 to 12 carbon atoms, phenyl, or tolyl;
R⁴ is alkylene of 2 to 12 carbon atoms, or phenylene.

6. A composition according to claim 4 wherein
a. is a polyimide resin where
R⁹ is a group having the formula

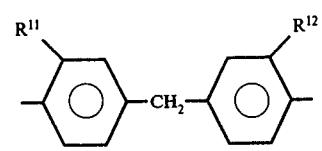

wherein R¹¹ and R¹² is hydrogen or chlorine, or

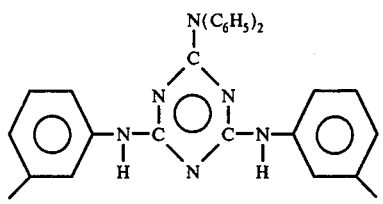

and (b) is the Schiff base 4,4'-methylenebis[N-(α-methylbenzylidene)aniline], N,N'-dibenzylidene-m-phenylenediamine, 4,4'-methylenebis(N-benzylidene aniline), or N,N'-dimethyl terephthaldimine.

7. A composition of matter comprising (a) a polyamide-acid resin having the formula

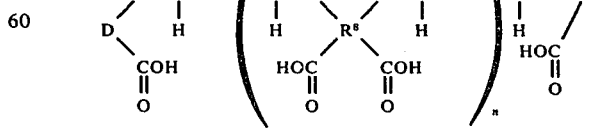

or a polyamide-amide acid having the formulas

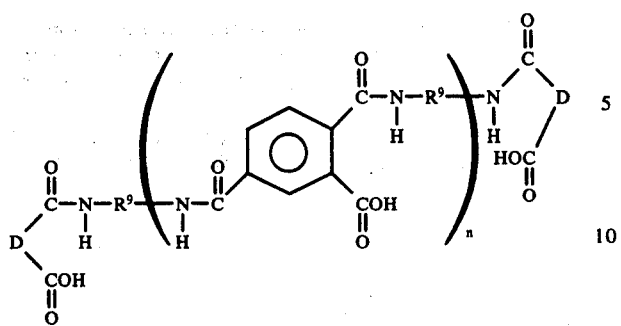

and

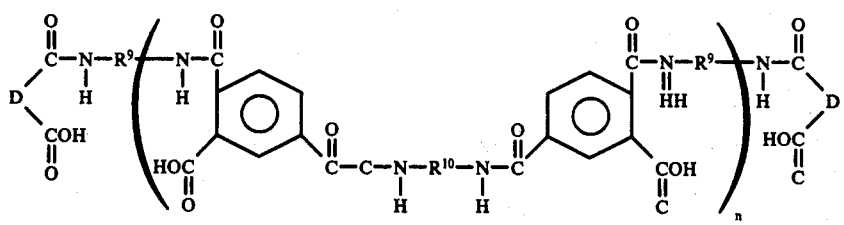

wherein
R⁸, R⁹, R¹⁰, n and D are as defined in claim 1, and
b. from about 0.5 to about 0.166 mole equivalents per mole equivalent of (a) of a Schiff base compound of the formula

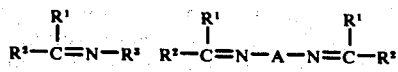

or

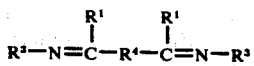

wherein
R¹, R², R³, R⁴, and A are as defined in claim 1.

8. A composition according to claim 7 wherein
R¹ and R² independently are hydrogen, an alkyl group containing from 1 to 12 carbon atoms, phenyl group, tolyl, chlorophenyl, or alkoxyphenyl, said alkoxy containing from 1 to 5 carbon atoms, with the proviso that only one of R¹ and R² may be hydrogen at the same time;
R³ is alkyl group containing from 1 to 12 carbon atoms, phenyl group, tolyl, chlorophenyl, or alkoxyphenyl, said alkoxy containing from 1 to 5 carbon atoms;
R⁴ is alkylene containing from 2 to 12 carbon atoms phenylene, tolylene, biphenylene, or a group having the formula

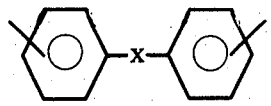

wherein X is O, sulfonyl or alkylene containing from 1 to 4 carbon atoms;
A is an alkylene group containing from 2 to 12 carbon atoms; cycloalkylene group containing from 4 to 6 carbon atoms, xylylene, group, an arylene group selected from phenylene, tolylene, biphenyl-ene, naphthylene, a substituted arylene group of the formula

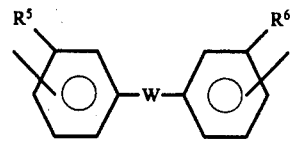

wherein W is sulfur, carbonyl, —NH, N—(lower)alkyl, —O—, —N-phenyl, sulfonyl, an alkylene group of from 1 to 4 carbon atoms, R⁵ and R⁶ are independent and each is hydrogen, chloro, or bromo, (lower) alkyl of from 1 to 5 carbon atoms, (lower) alkoxy containing from 1 to 5 carbon atoms, or a group having the fromula

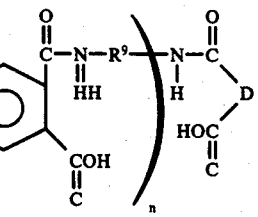

where Y is a covalent bond or —NH, and R⁷ is phenyl, piperidino, hydrogen, diphenylamino or di (lower) alkyl amino, and
R⁸, R⁹, R¹⁰, n and D are as defined in claim 7.

9. A composition according to claim 8 wherein
a. is a polyamide-acid resin where
R⁹ is meta or para phenylene; a group having the formula

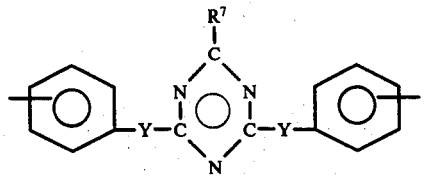

wherein V is methylene, S or O,
R¹¹ and R¹² are independent and each is chloro or hydrogen; or a group having the formula

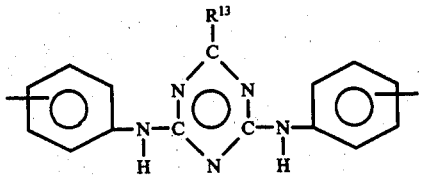

R¹³ is diphenyl amino or di(lower)alkyl amino
R⁸ has the formula

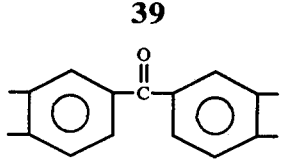

$n$ is an integer of from 2 to 15, and b. is a Schiff base of the formula

wherein

R¹ and R² independently is hydrogen, an alkyl group containing from 1 to 12 carbon atoms, phenyl group, tolyl, chlorophenyl, or alkoxyphenyl, said alkoxy containing from 1 to 12 carbon atoms, phenyl group, tolyl, chlorophenyl, or alkoxyphenyl, said alkoxy containing from 1 to 5 carbon atoms, with the proviso that only one of R¹ and R² may be hydrogen at the same time;

R³ is alkyl of 1 to 12 carbon atoms, phenyl, or tolyl;

R⁴ is alkylene of 2 to 12 carbon atoms, or phenylene.

10. A composition according to claim 8 wherein a. is a polyamide-amide acid resin where R⁹ and R¹⁰ is meta or para phenylene or a group having the formula

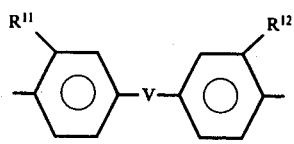

wherein V is methylene, S or —O—,

R¹¹ and R¹² are independent and each is a chloro or hydrogen b. is a Schiff base of the formula

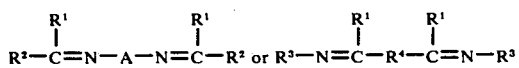

wherein

R¹ and R² independently is hydrogen, an alkyl group containing from 1 to 12 carbon atoms, phenyl group, tolyl, chlorophenyl, or alkoxyphenyl, said alkoxy containing from 1 to 12 carbon atoms, phenyl group, tolyl, chlorophenyl, or alkoxyphenyl, said alkoxy containing from 1 to 5 carbon atoms, with the proviso that only one of R¹ and R² may be hydrogen at the same time:

R³ is alkyl of 1 to 12 carbon atoms, phenyl, or tolyl;

R⁴ is alkylene of 2 to 12 carbon atoms, or phenylene.

11. A composition according to claim 10 wherein (a) is a polyamide-acid resin where R⁹ is a group of the formula

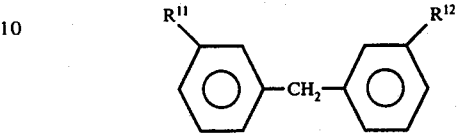

wherein R¹¹ and R¹² is hydrogen or chlorine, or a group having the formula

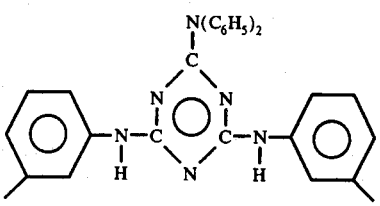

and (b) is the Schiff base 4,4'-methylenebis[N-(α-methyl-benzylidene)aniline], N,N'-dibenzylidene-m-phenylenediamine, 4,4'-methylenebis(N-benzylidene aniline) or N,N'-dimethyl terephthaldimine.

12. A solution of a composition according to claim 1 in a volatile organic solvent for said composition.

13. A solution of a composition according to claim 7 in a volatile organic solvent for said composition.

14. A molding powder comprising the composition according to claim 1.

15. A molding powder comprising the composition of claim 7.

16. The crosslinked resin obtained by heating at 100° to 250° C the composition consisting essentially of the one according to claim 1.

17. The crosslinked resin obtained by heating at 100° C to 250° C the composition consisting essentially of the one according to claim 7.

18. A polymer composition comprising:

a. is a polyimide resin having the formula

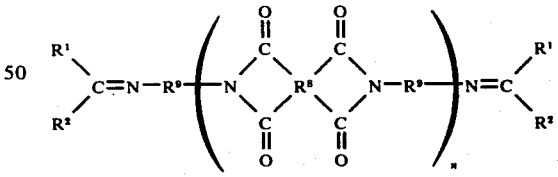

or a polyamide-imide resin having the formulas

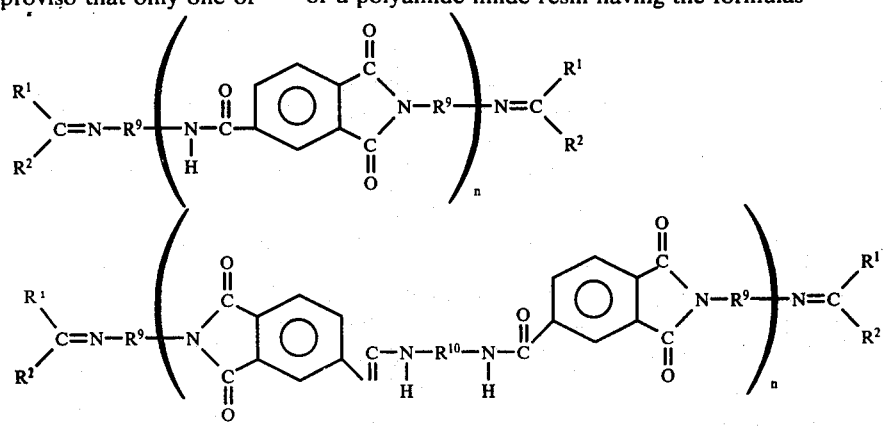

wherein
- R$^1$ and R$^2$ independently is hydrogen, an alkyl group containing from 1 to 12 carbon atoms, an aryl group containing from 6 to 12 carbon atoms, an alkaryl group containing from 7 to 15 carbon atoms, an aralkyl group containing from 7 to 15 carbon atoms, chlorophenyl, alkoxyphenyl, said alkoxy containing from 1 to 5 carbon atoms, or together with the carbon to which they are attached form a monocyclic ring containing 5 to 6 carbon atoms, with the proviso that only one of R$^1$ and R$^2$ may be hydrogen at the same time;
- R$^8$ is a tetravalent aliphatic, cycloaliphatic, aromatic or heterocyclic radical containing at least 2 carbon atoms;
- R$^{10}$ and R$^9$ are the same or different and each is an alkylene group containing from 2 to 12 carbon atoms; a cycloalkylene group containing from 4 to 6 carbon atoms; an arylene group selected from phenylene, xylylene, tolylene, biphenylene, naphthylene, a substituted arylene group of the formula

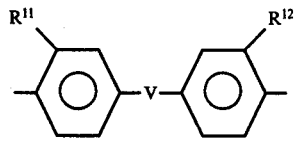

wherein V is sulfur, carbonyl,

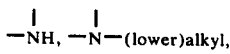

O, —SS—,

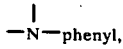

sulfonyl, an alkylene group of from 1 to 4 carbon atoms, a di(lower) alkyl silyl group containing from 1 to 5 carbon atoms, a diphenylsilyl group, —P(O) lower alkyl, said lower alkyl containing from 1 to 5 carbon atoms,

R$^{11}$ and R$^{12}$ are independent and each is hydrogen, chloro, bromo, a (lower)alkyl group containing from 1 to 5 carbon atoms, a (lower)alkoxy group containing from 1 to 5 carbon atoms or a group having the formula

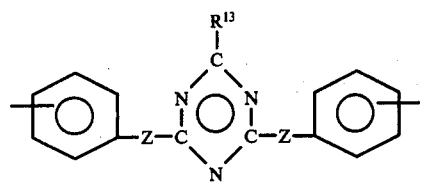

wherein Z is a covalent bond or —NH, and R$^{13}$ is phenyl, piperidino, H, diphenylamino or di(lower)alkyl amino;
n is an integer of at least 1;
b. an N,N'-bis-imide of the formula

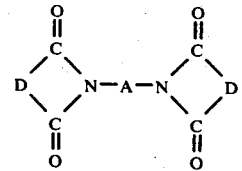

wherein A is an alkylene group containing from 2 to 12 carbon atoms; cycloalkylene group containing from 4 to 6 carbon atoms, a xylylene group, an arylene group selected from phenylene, tolylene, biphenylene, naphthylene, a substituted arylene group of the formula

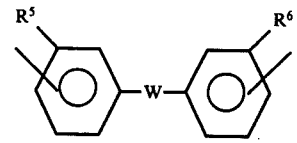

wherein W is sulfur, carbonyl, —NH, —N(lower)alkyl, —O—, —N-phenyl, sulfonyl, an alkylene group of from 1 to 3 carbon atoms, R$^5$ and R$^6$ are independent and each is hydrogen, chloro, or bromo, (lower) alkyl of from 1 to 5 carbon atoms, (lower) alkoxy containing from 1 to 5 carbon atoms, or a group having the formula

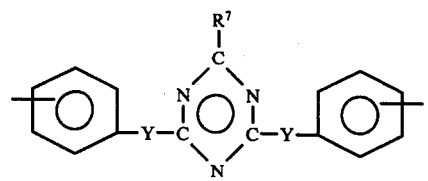

wherein Y is a covalent bond or —NH, and R$^7$ is phenyl, piperidino, hydrogen, diphenylamino or di(lower) alkyl amino.
D is a divalent radical containing olefinic unsaturation selected from the group having the formula

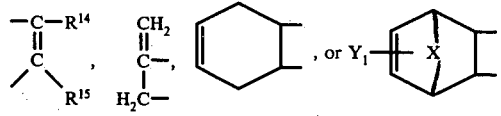

wherein
- R$^{14}$ and R$^{15}$ independently of each other is hydrogen, methyl, bromo or chloro;
- Y$_1$ is hydrogen or methyl
- X is carbonyl, oxygen, methylene or sulfur
wherein the number of equivalence of (a) to the number of equivalence of (b) is in the ratio of 1:2 to 1:6.

19. A composition according to claim 18 wherein:
a. is a polyimide resin where
R$^9$ is meta or para phenylene, a group having the formula

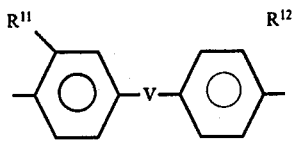

wherein V is methylene, S or O,
  $R^{11}$ and $R^{12}$ are independent and each is a chloro or hydrogen; or a group having the formula

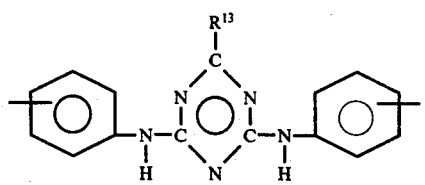

where $R^{13}$ is diphenylamino or di(lower)alkyl amino
$R^8$ has the formula

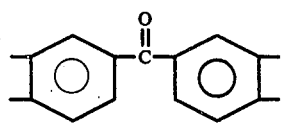

$n$ is an integer of from 2 to 15.

20. A composition according to claim 18 wherein
a. is a polyamide-imide resin where
  $R^9$ and $R^{10}$ are meta or para phenylene or a group having the formula

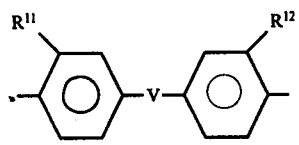

wherein V is methylene, S or —O—,
  $R^{11}$ and $R^{12}$ are independent and each is chloro or hydrogen.

21. A composition according to claim 19 wherein
a. is a polyimide resin where $R^9$ is a group having the formula

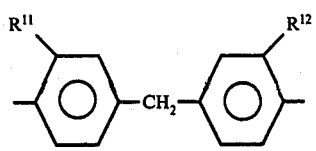

wherein $R^{11}$ and $R^{12}$ is hydrogen or chlorine, or a group of the formula or

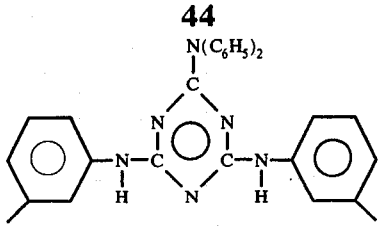

where in (b)
  A is phenylene or

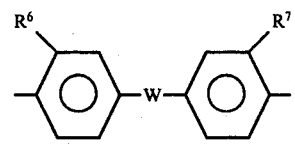

wherein $R^6$ and $R^7$ is hydrogen or chloro;
  W is —O— or methylene; and
  D is

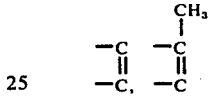

22. A polymer composition comprising
a. is a polyamide-acid resin having the formula

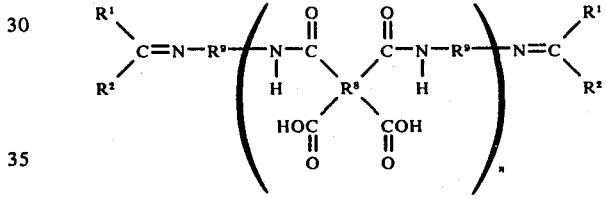

or a polyamide-amide acid having the formulas

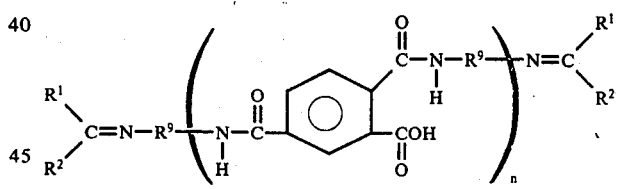

and

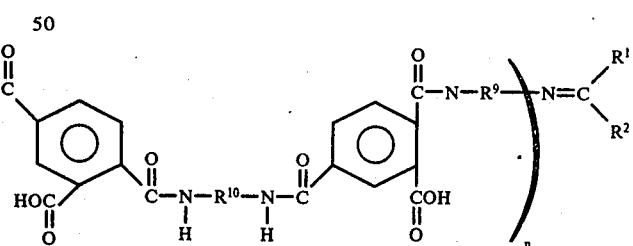

wherein $R^1$ and $R^2$ independently is hydrogen, an alkyl group containing from 1 to 12 carbon atoms, an aryl group containing from 6 to 12 carbon atoms, an alkarly group containing from 7 to 15 carbon atoms, an aralkyl group containing from 7 to 15 carbon atoms, chlorophenyl, alkoxyphenyl, said alkoxy containing from 1 to 5 carbon atoms, or together with the carbon to which they are attached form a monocyclic ring containing 5 to 6 carbon atoms, with the proviso that only one of $R^1$ and $R^2$ may be hydrogen at the same time;

$R^8$ is a tetravalent aliphatic, cycloaliphatic, aromatic or heterocyclic radical containing at least 2 carbon atoms;

$R^{10}$ and $R^9$ are the same or different and each is an alkylene group containing from 2 to 12 carbon atoms; a cycloalkylene group containing from 4 to 6 carbon atoms; an arylene group selected from phenylene, xylylene, tolylene, biphenylene, naphthylene, a substituted arylene group of the formula

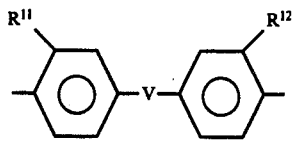

wherein V is sulfur, carbonyl,

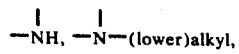

O, —SS—,

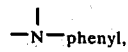

sulfonyl, an alkylene group of from 1 to 3 carbon atoms, a di(lower)alkyl silyl group containing from 1 to 5 carbon atoms, a diphenylsilyl group, —P(O) (lower)alkyl, said lower alkyl containing from 1 to 5 carbon atoms, —N=N,

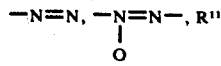

$R^{11}$ and $R^{12}$ are independent and each is hydrogen, chloro, bromo, a (lower)alkyl group containing from 1 to 5 carbon atoms, a (lower)alkoxy group containing from 1 to 5 carbon atoms or a group having the formula

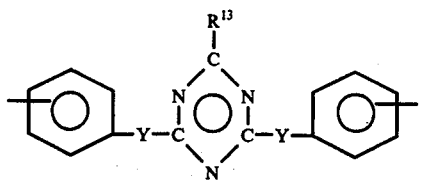

wherein Z is a covalent bond or —NH, and $R^7$ is phenyl, piperidino, H, diphenylamino or di(lower)alkyl amino;

n is an integer of at least 1;

b. an N,N'-bis-imide of the formula

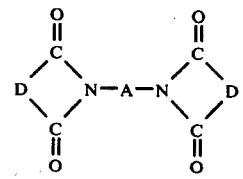

wherein A is an alkylene group containing from 2 to 12 carbon atoms; cycloalkylene group containing from 4 to 6 carbon atoms, a xylylene group, an arylene group selected from phenylene, tolylene, biphenylene, naphthylene, a substituted arylene group of the formula

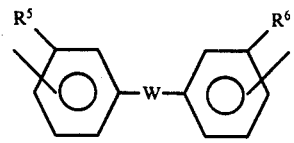

wherein W is sulfur, carbonyl, —NH, —N(lower)alkyl, —O—, —N-phenyl, sulfonyl, an alkylene group of from 1 to 3 carbon atoms, $R^5$ and $R^6$ are independent and each is hydrogen, chloro, or bromo, (lower)alkyl of from 1 to 5 carbon atoms, (lower) alkoxy containing from 1 to 5 carbon atoms, or a group having the formula

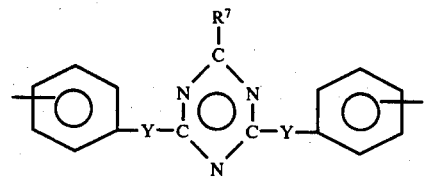

wherein Y is a covalent bond or —NH, and $R^7$ is phenyl, piperidino, hydrogen, diphenylamino or di(lower) alkyl amino.

D is a divalent radical containing olefinic unsaturation selected from the group having the formula

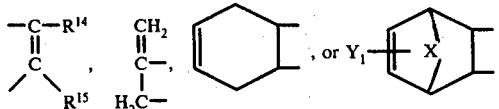

wherein $R^{14}$ and $R^{15}$ independently of each other is hydrogen, methyl, bromo or chloro;

$Y_1$ is hydrogen or methyl

X is carbonyl, oxygen, methylene or sulfur wherein the number of equivalence of (a) to the number of equivalence of (b) is in the ratio of 1:2 to 1:6.

23. A composition according to claim 22 wherein a. is a polyamide-acid resin where
R⁹ is meta or para phenylene; a group having the formula

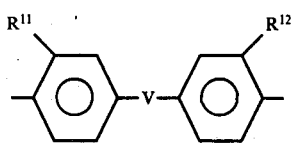

wherein V is methylene, S or O,
R¹¹ and R¹² are independent and each is chloro or hydrogen; or a group having the formula

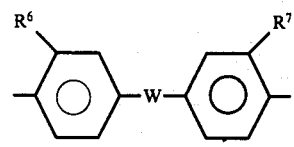

R¹³ is diphenyl amino or di(lower)alkyl amino
R⁸ has the formula

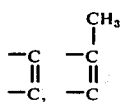

n is an integer of from 2 to 15.

24. A composition according to claim 23 wherein
a. is a polyamide-amide acid resin where
R⁹ and R¹⁰ is meta or para phenylene or a group having the formula

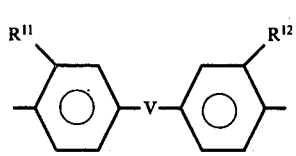

wherein V is methylene, S or —O—,
R¹¹ and R¹² are independent and each is a chloro or hydrogen.

25. A composition according to claim 23 wherein
a. is a polyamide-acid resin where R⁹ is

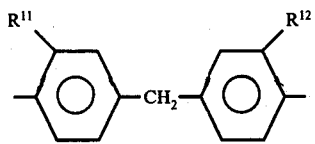

wherein R¹¹ and R¹² is hydrogen or chlorine or a group having the formula

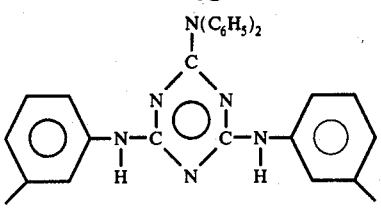

wherein (b)
A is phenylene, or

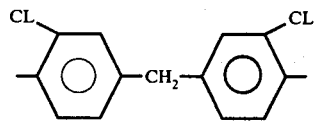

wherein R⁶ and R⁷ is hydrogen or chloro;
W is —O— or methylene; and
D is

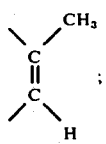

26. A solution of a composition according to claim 18 in a volatile organic solvent for said composition.

27. A solution of a composition according to claim 22 in a volatile organic solvent for said composition.

28. A molding powder comprising the composition according to claim 18.

29. A molding powder comprising the composition of claim 22.

30. The crosslinked resin obtained by heating at 100° to 250° C the composition consisting essentially of the one according to claim 18.

31. The crosslinked resin obtained by heating at 100° to 250° C the composition consisting essentially of the one according to claim 22.

32. A composition according to claim 6 wherein
a. is a polyimide resin where
R⁹ is a group having the formula and
D is and
b. is the Schiff base N,N'-dimethyl terephthaldimine.

* * * * *